April 17, 1951  M. B. WILLIS  2,549,150
PRINTING DEVICE FOR PRODUCING GRAPHS, PRINTS OR THE LIKE
Filed Jan. 10, 1945  22 Sheets-Sheet 1
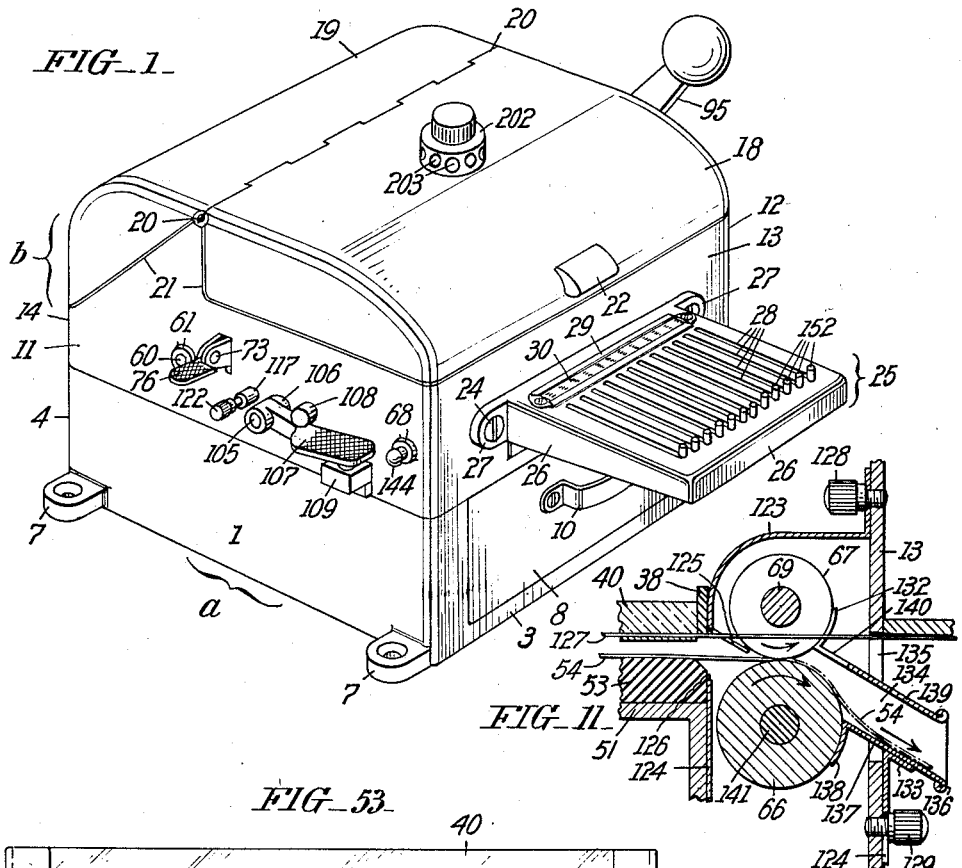
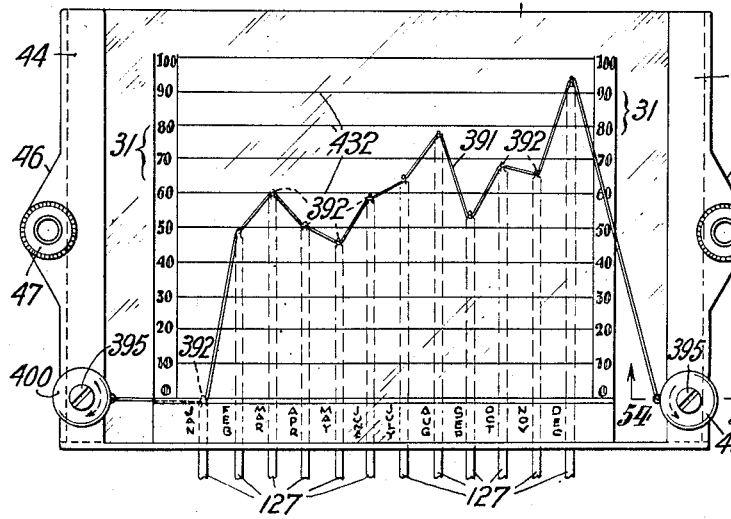
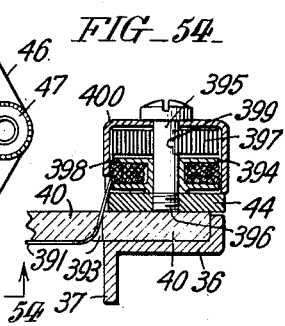
INVENTOR:
Maurice B. Willis,
BY
Paul & Paul
ATTORNEYS.

April 17, 1951  M. B. WILLIS  2,549,150
PRINTING DEVICE FOR PRODUCING GRAPHS, PRINTS OR THE LIKE
Filed Jan. 10, 1945  22 Sheets-Sheet 2
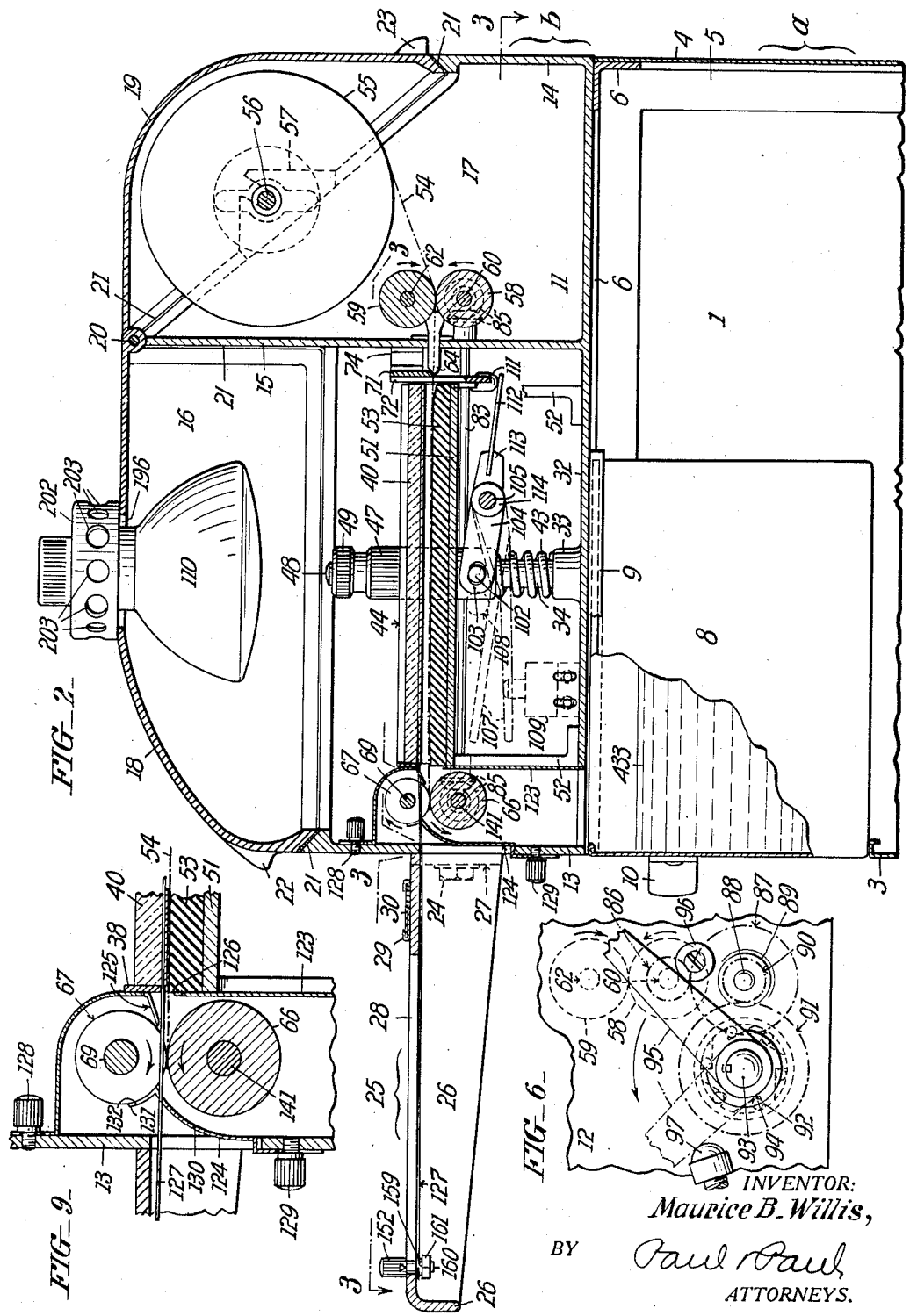
INVENTOR:
Maurice B. Willis,
BY Paul & Paul
ATTORNEYS.

April 17, 1951  M. B. WILLIS  2,549,150
PRINTING DEVICE FOR PRODUCING GRAPHS, PRINTS OR THE LIKE
Filed Jan. 10, 1945  22 Sheets-Sheet 3
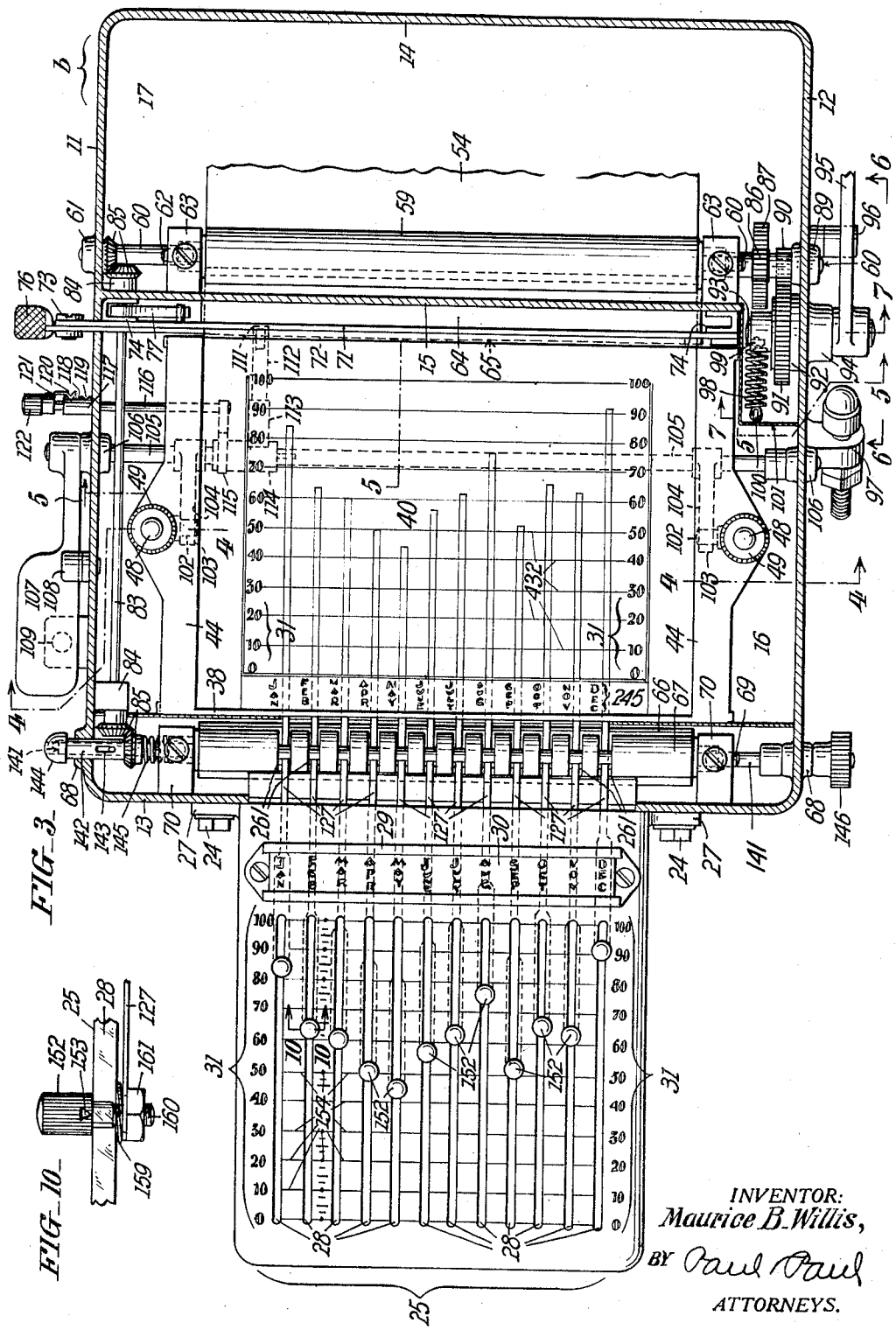
INVENTOR:
Maurice B. Willis,
BY Paul & Paul
ATTORNEYS.

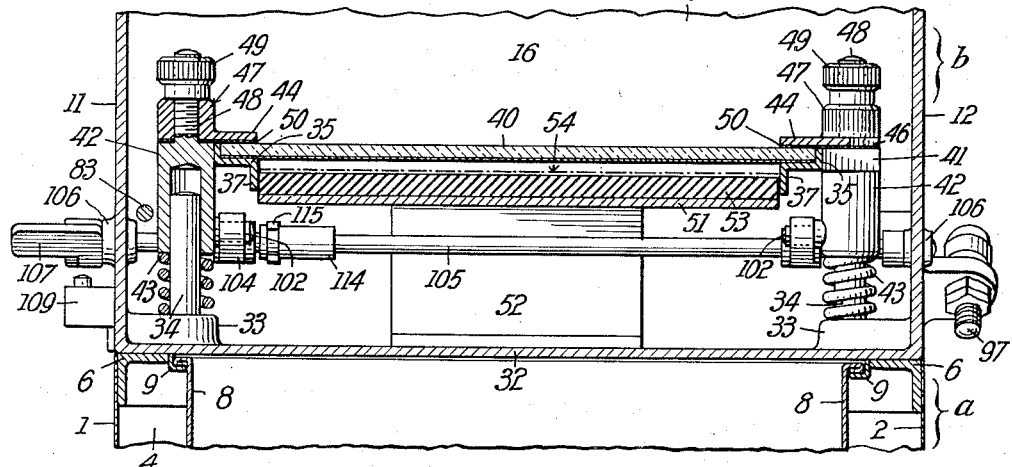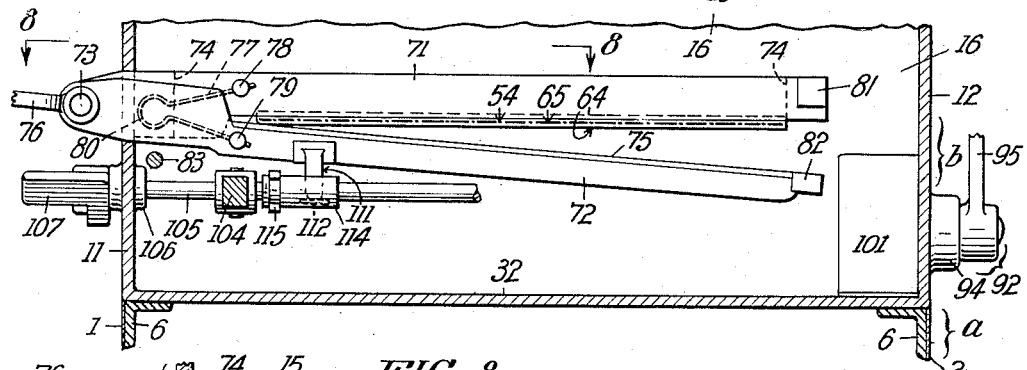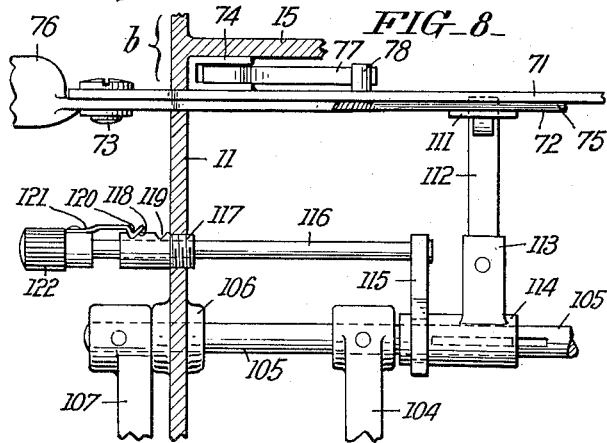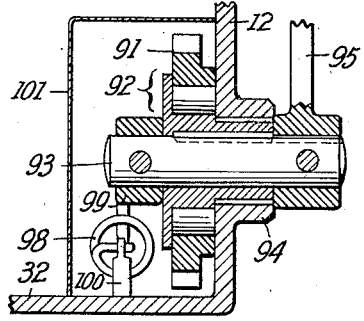

April 17, 1951   M. B. WILLIS   2,549,150
PRINTING DEVICE FOR PRODUCING GRAPHS, PRINTS OR THE LIKE
Filed Jan. 10, 1945   22 Sheets-Sheet 5
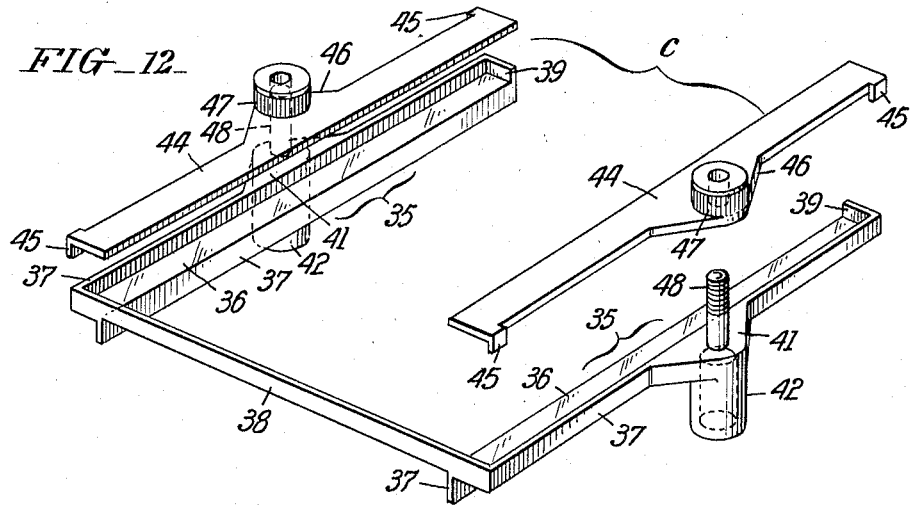
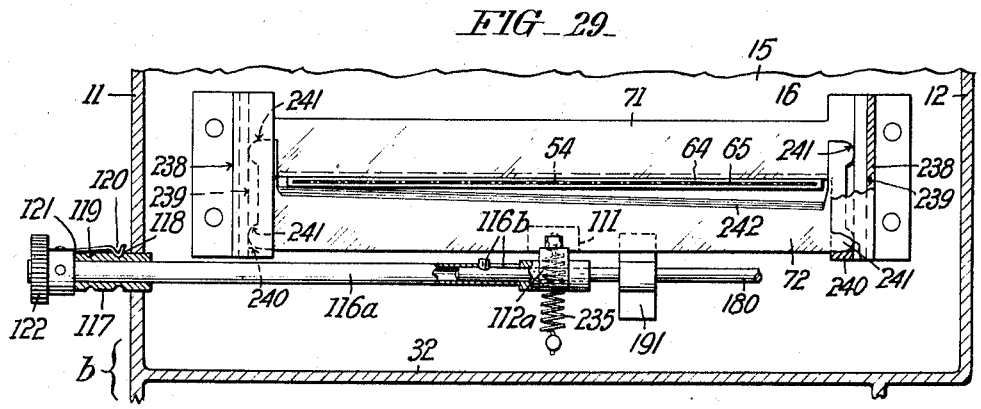
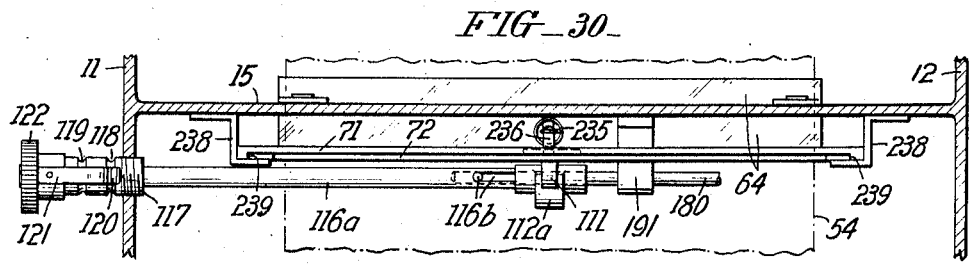

April 17, 1951 M. B. WILLIS 2,549,150
PRINTING DEVICE FOR PRODUCING GRAPHS, PRINTS OR THE LIKE
Filed Jan. 10, 1945 22 Sheets-Sheet 6
FIG_13_
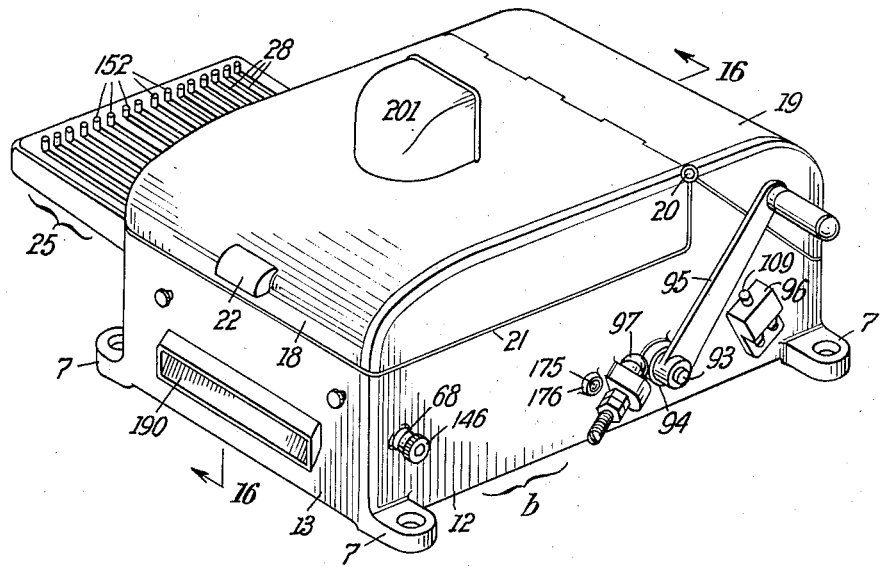
FIG_14_
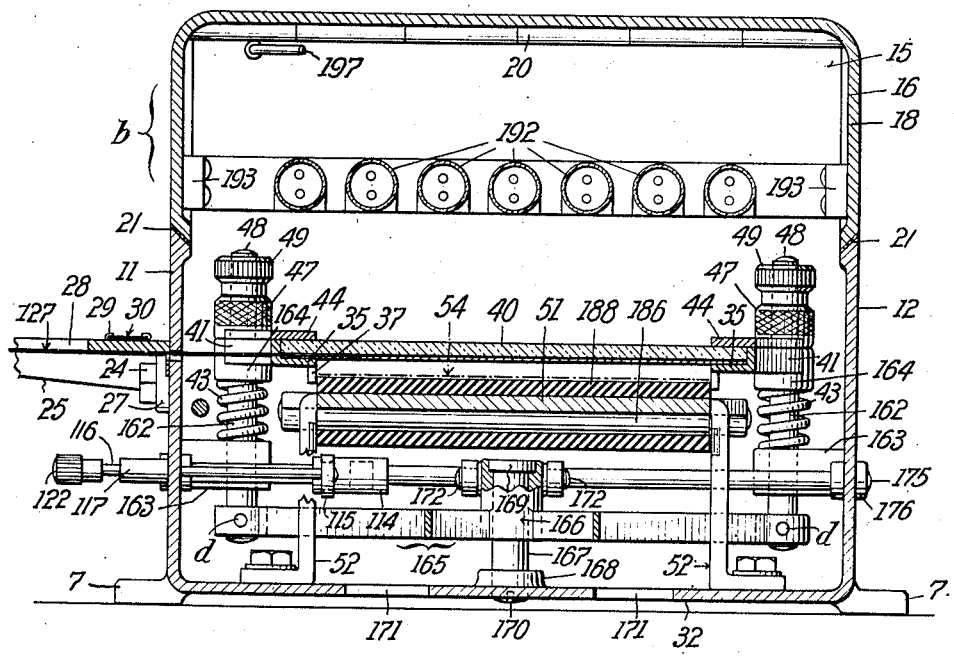
INVENTOR:
Maurice B. Willis,
BY Paul & Paul
ATTORNEYS.

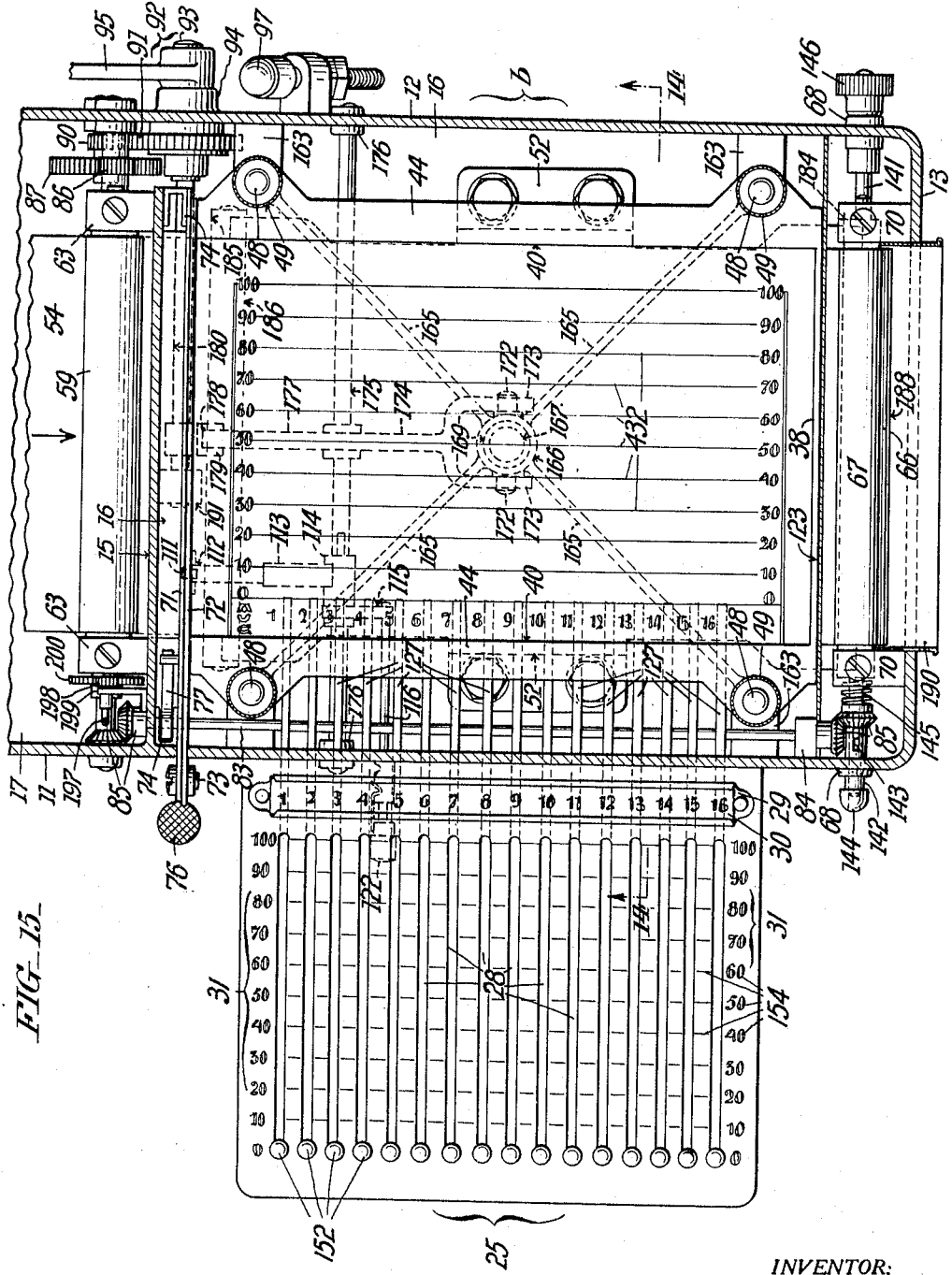

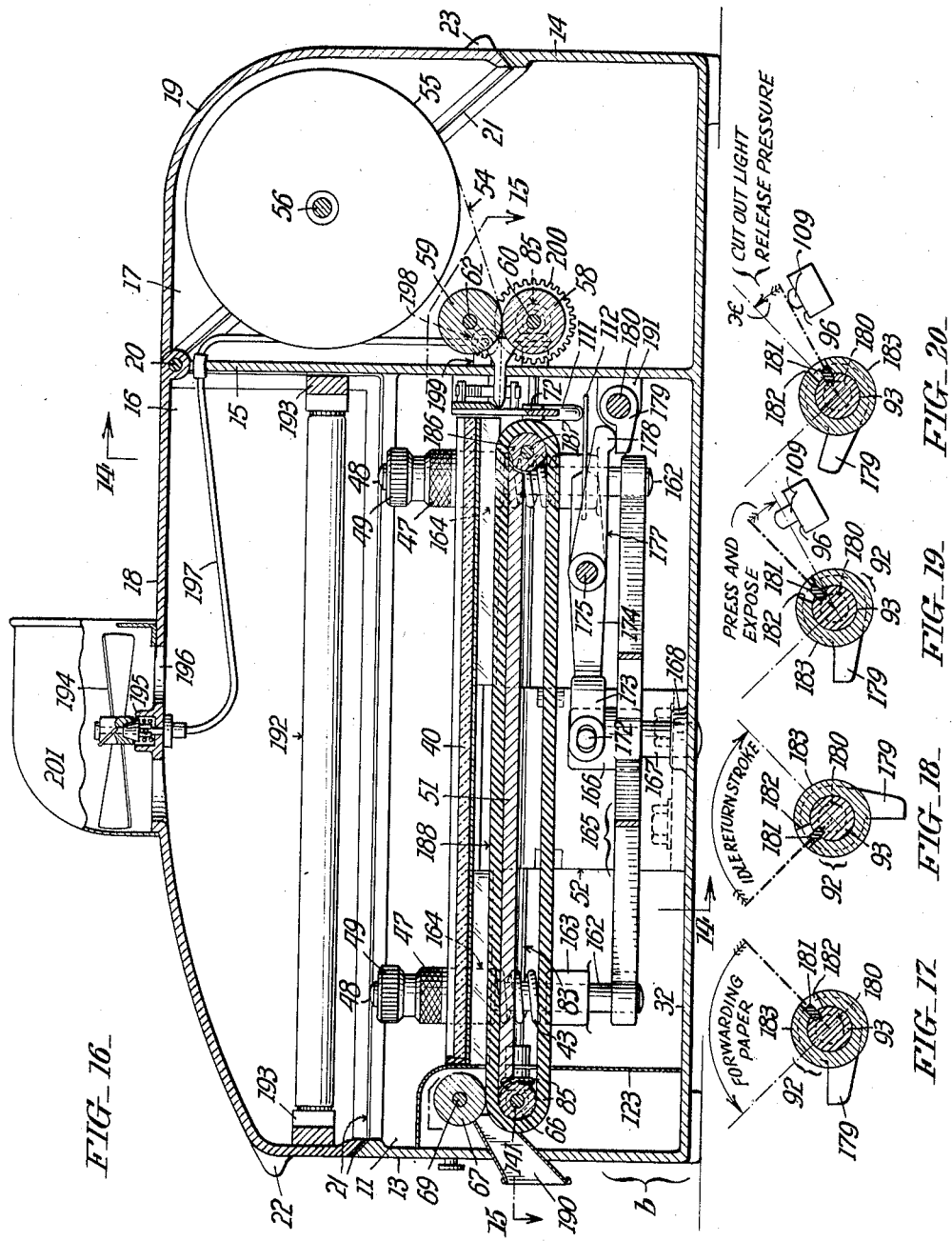

April 17, 1951 M. B. WILLIS 2,549,150
PRINTING DEVICE FOR PRODUCING GRAPHS, PRINTS OR THE LIKE
Filed Jan. 10, 1945 22 Sheets-Sheet 9
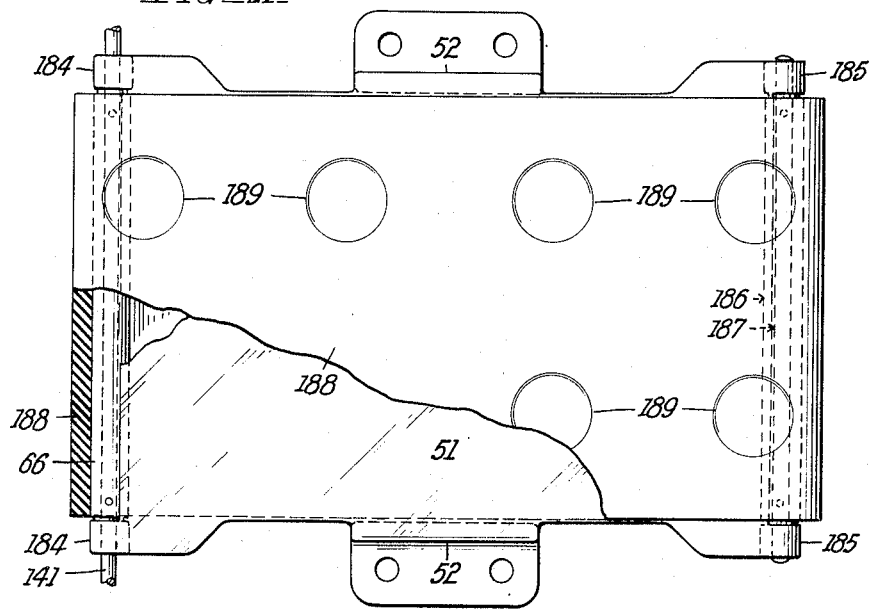
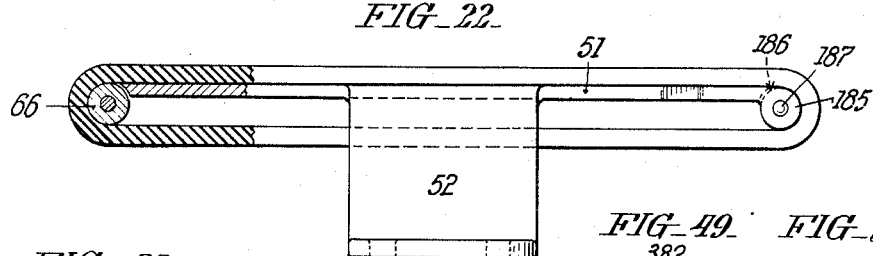
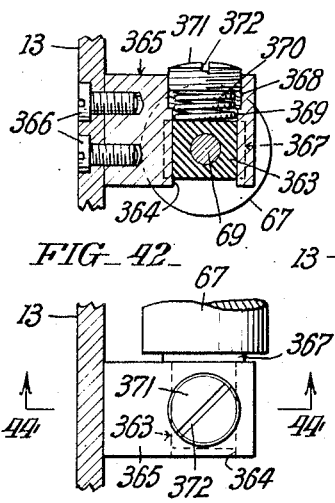
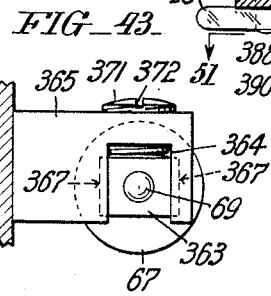
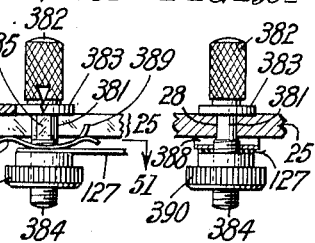
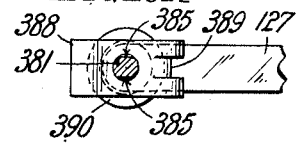
INVENTOR:
Maurice B. Willis,
BY Paul & Paul
ATTORNEYS.

April 17, 1951 M. B. WILLIS 2,549,150
PRINTING DEVICE FOR PRODUCING GRAPHS, PRINTS OR THE LIKE
Filed Jan. 10, 1945 22 Sheets-Sheet 10
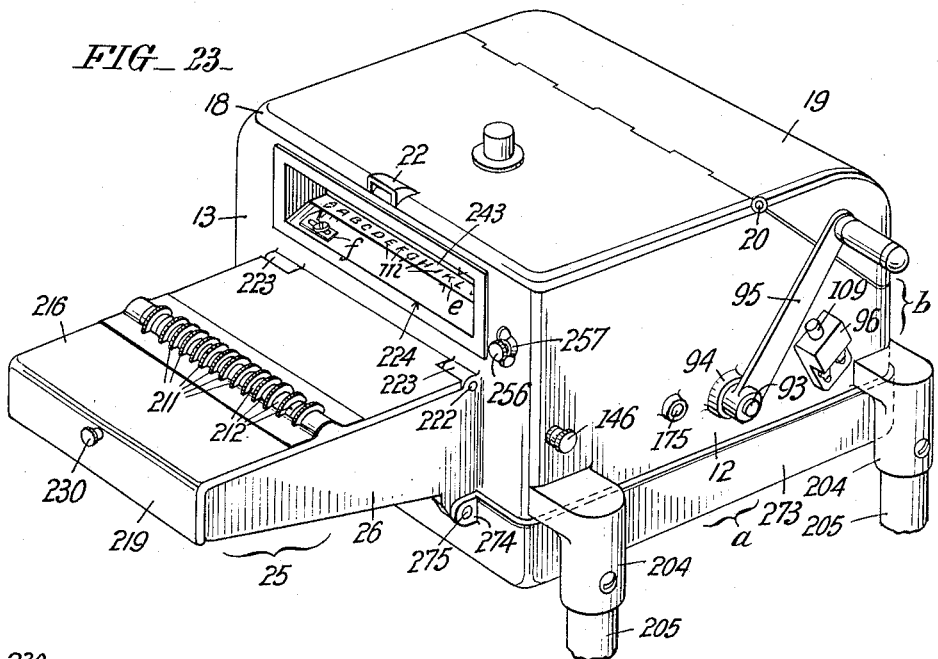
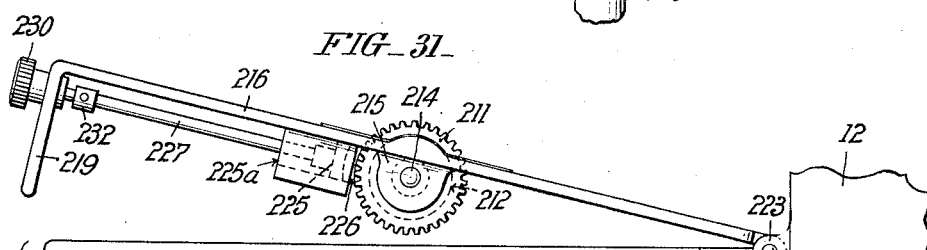
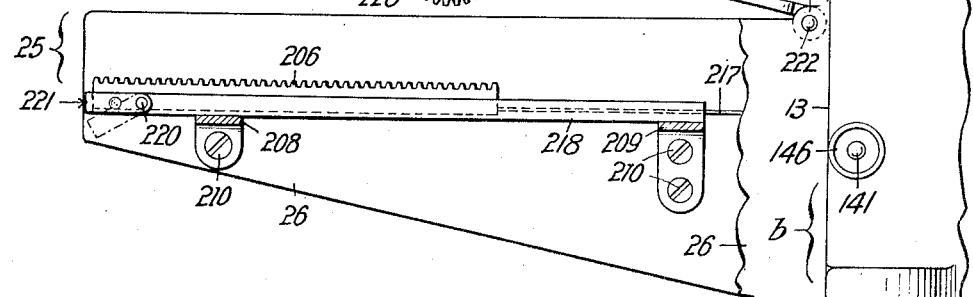
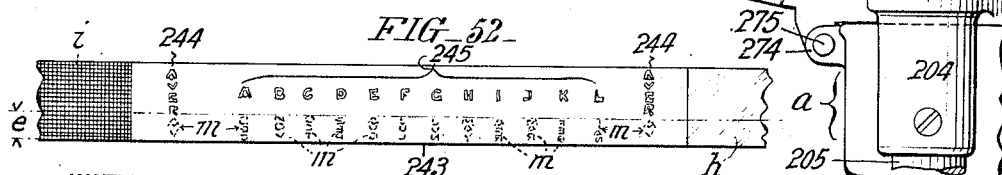
WITNESSES
INVENTOR:
Maurice B. Willis,
BY Paul & Paul
ATTORNEYS.

April 17, 1951 M. B. WILLIS 2,549,150
PRINTING DEVICE FOR PRODUCING GRAPHS, PRINTS OR THE LIKE
Filed Jan. 10, 1945 22 Sheets-Sheet 11
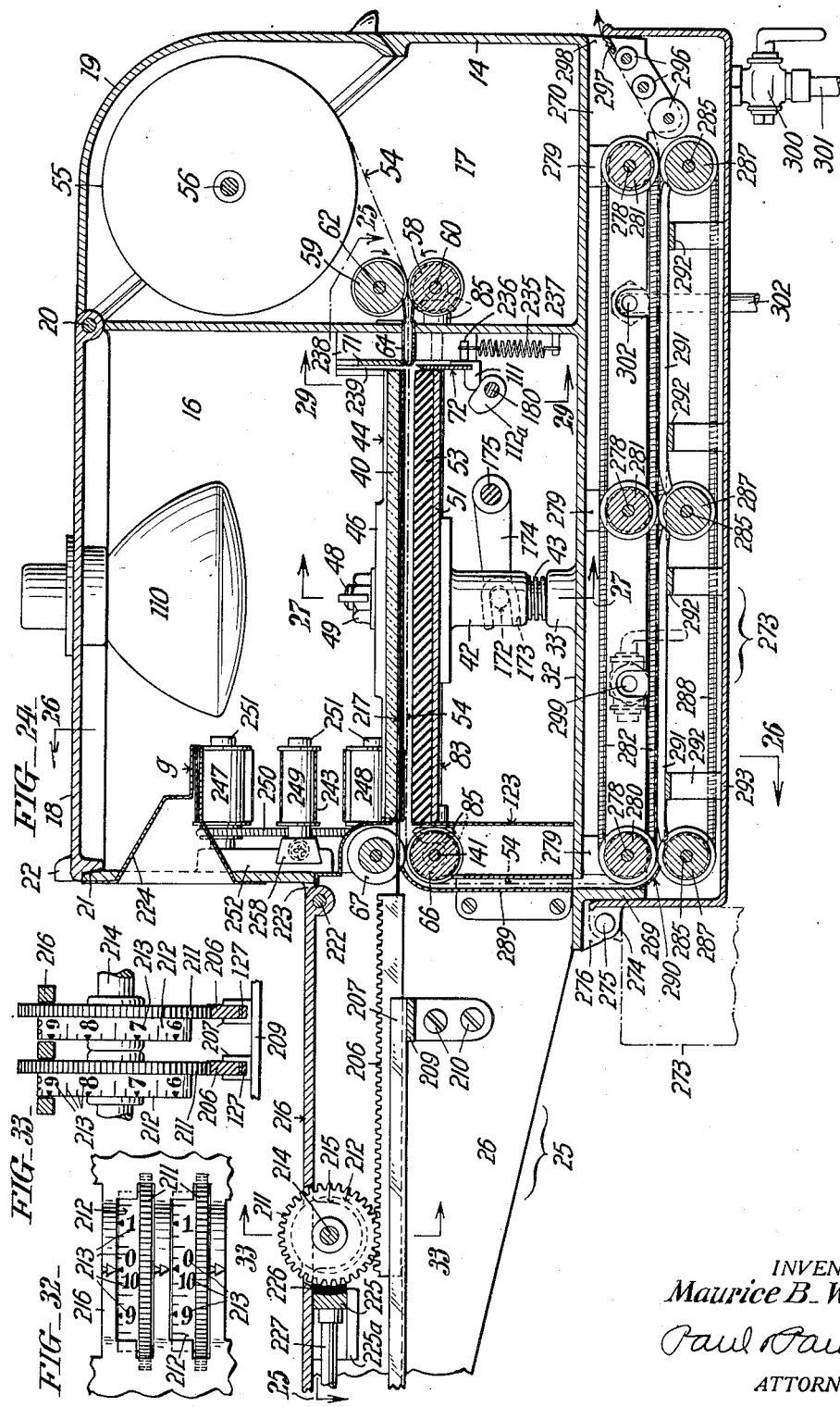
INVENTOR:
Maurice B. Willis,
Paul & Paul
ATTORNEYS.

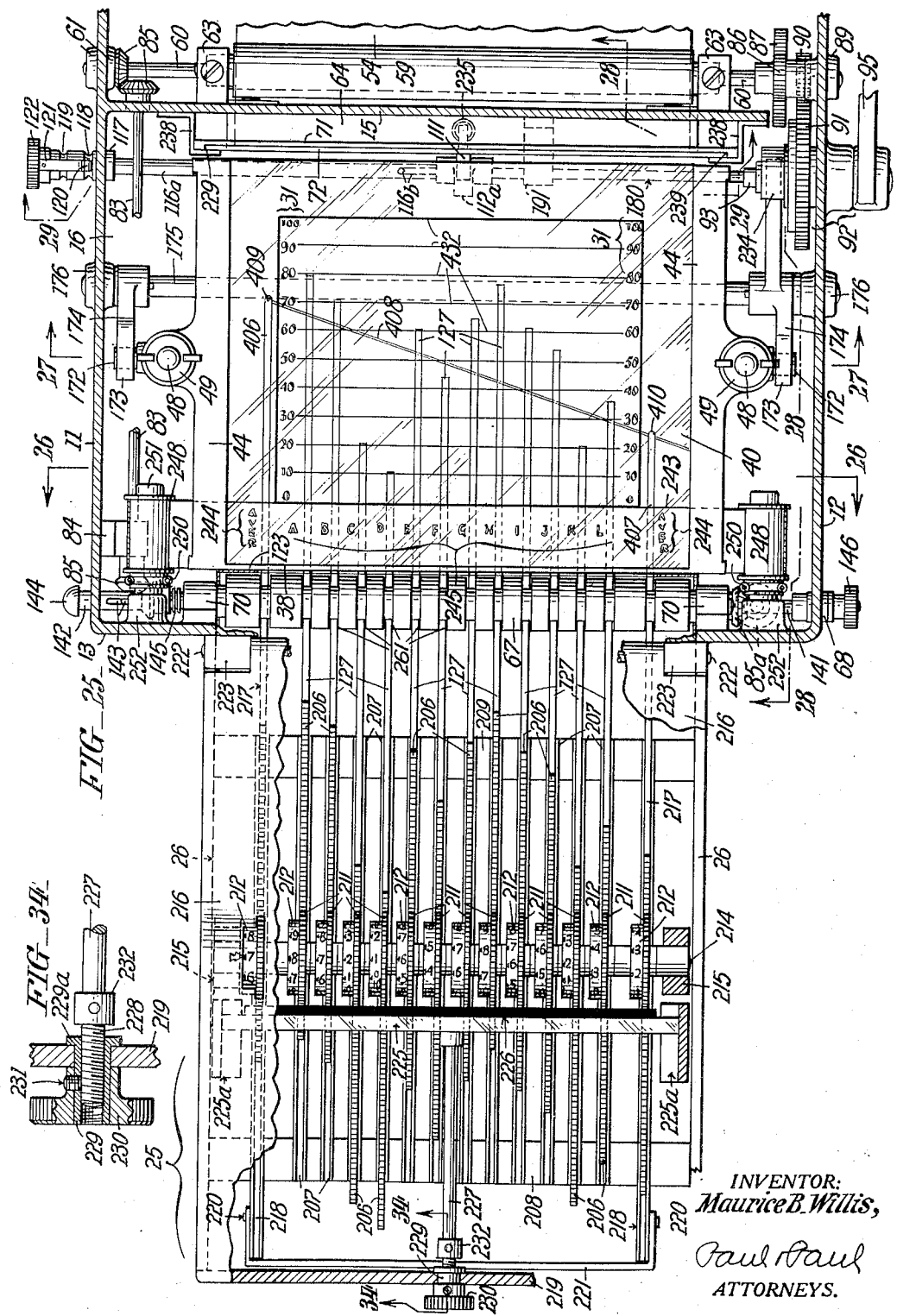

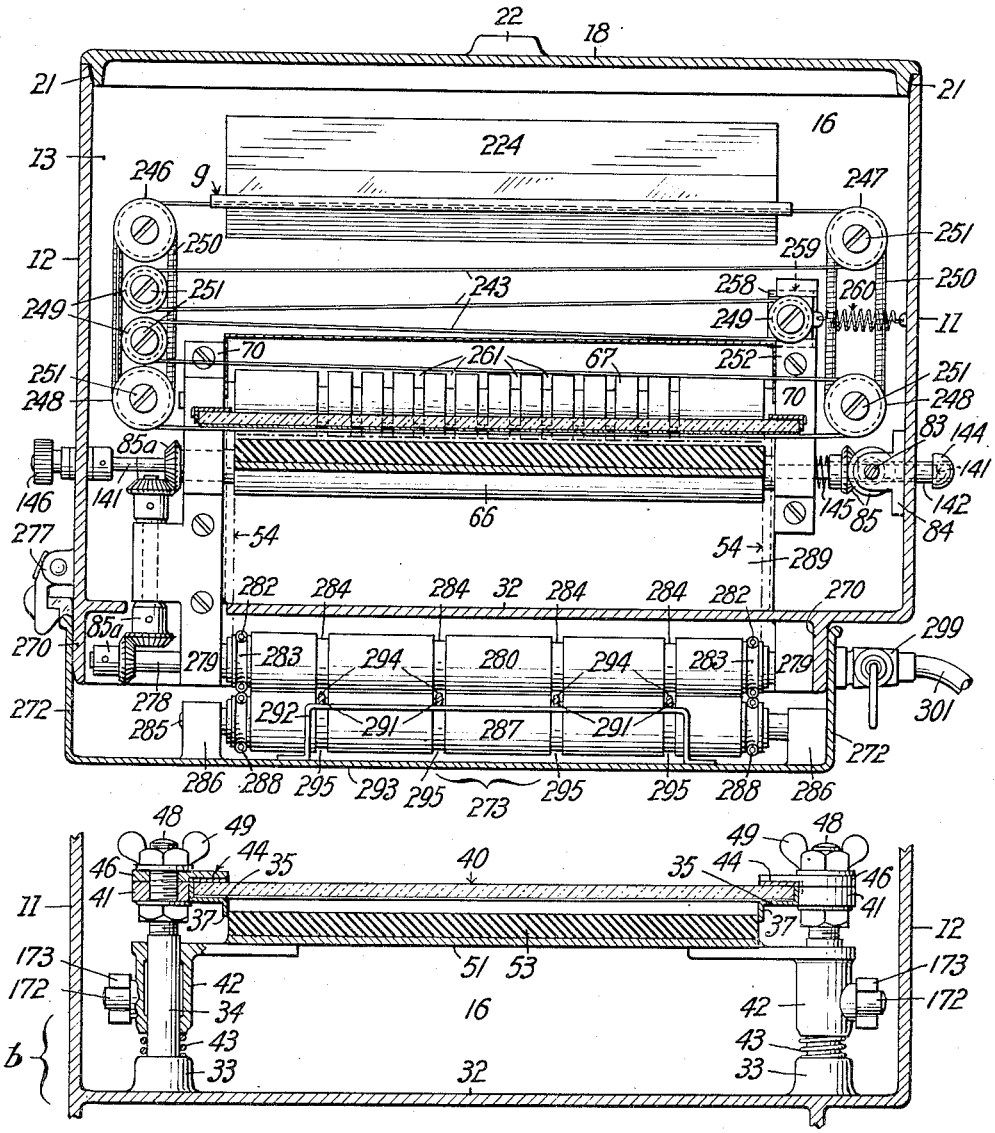

April 17, 1951 M. B. WILLIS 2,549,150
PRINTING DEVICE FOR PRODUCING GRAPHS, PRINTS OR THE LIKE
Filed Jan. 10, 1945 22 Sheets-Sheet 14
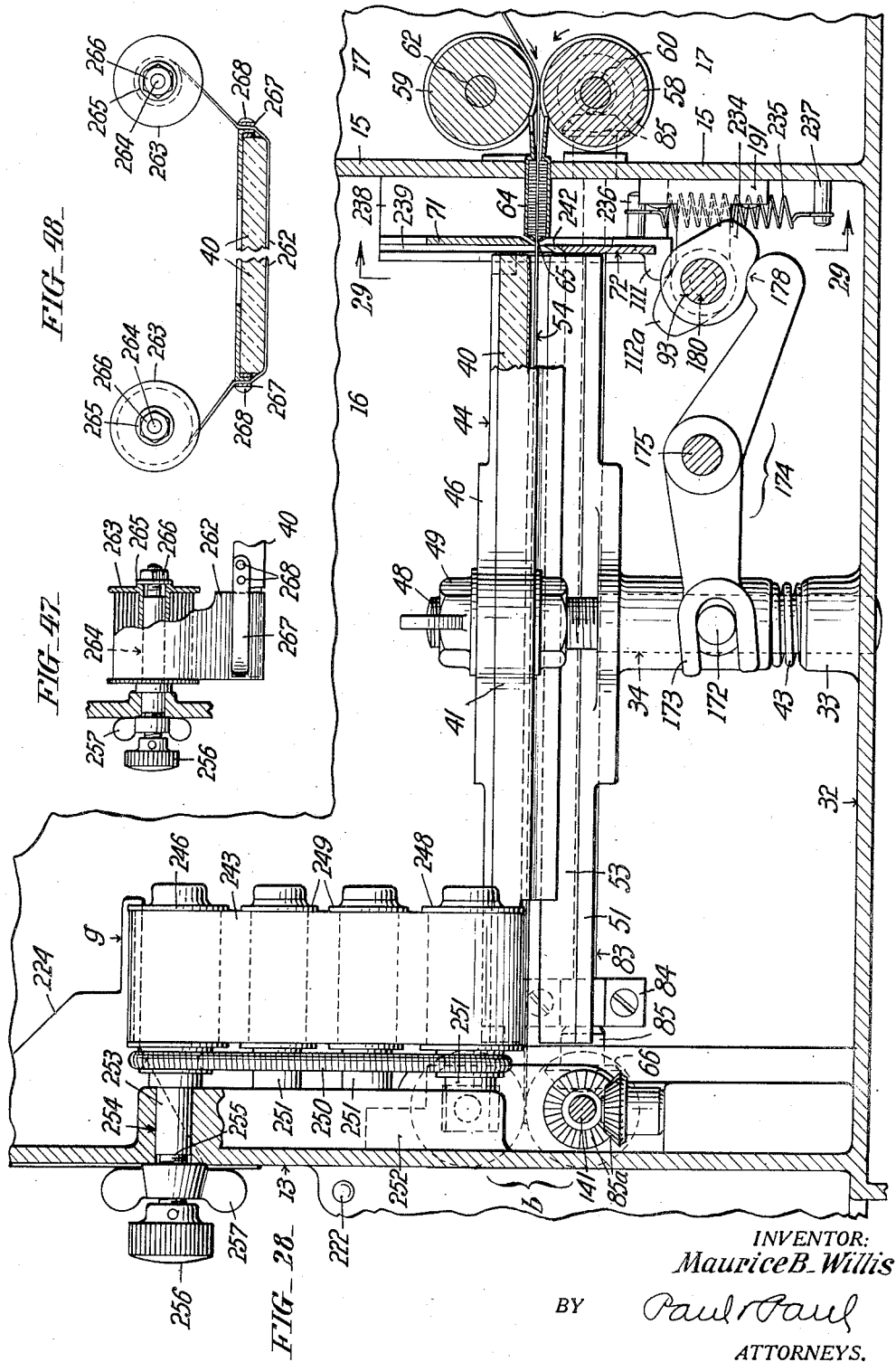
INVENTOR:
*Maurice B. Willis*,
BY *Paul & Paul*
ATTORNEYS.

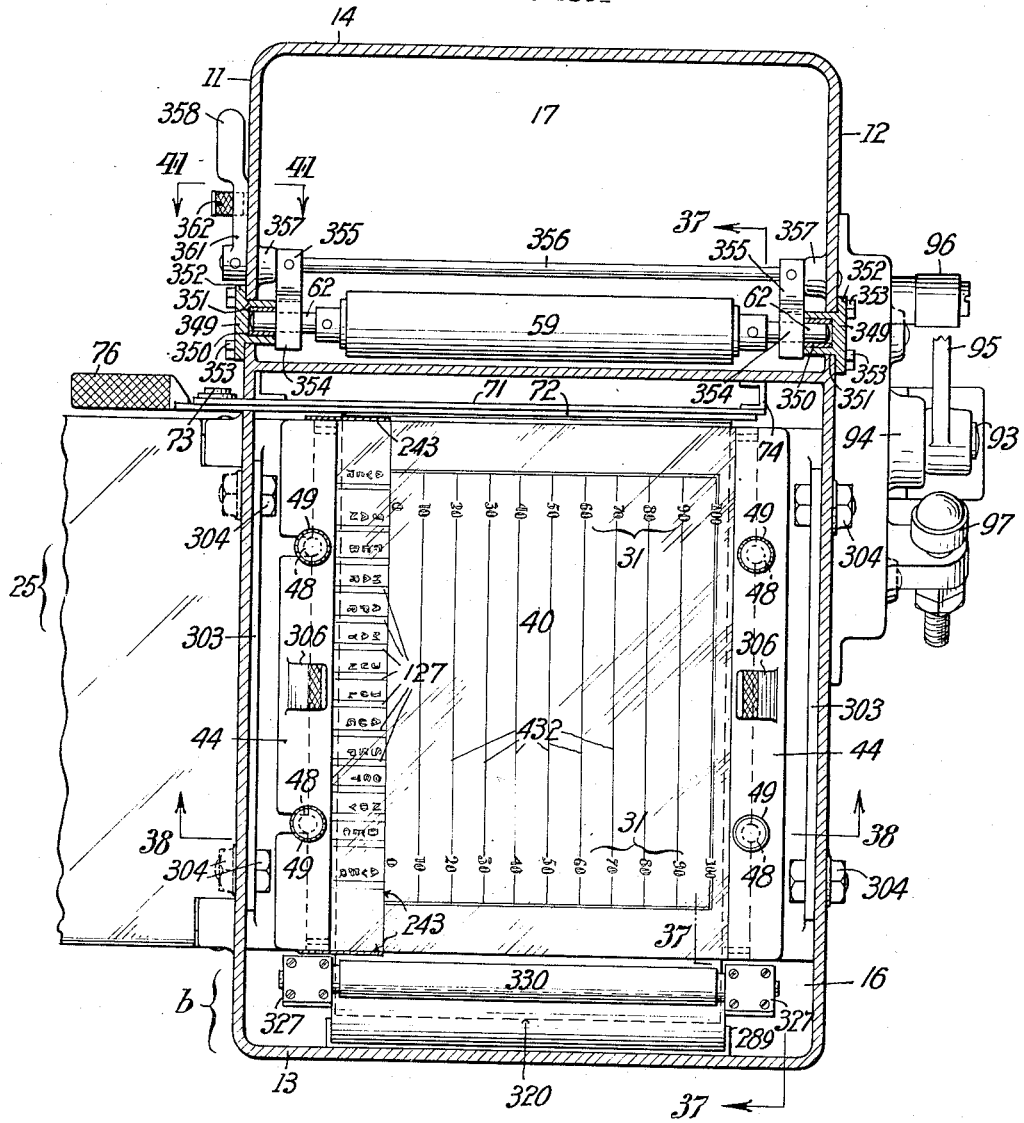
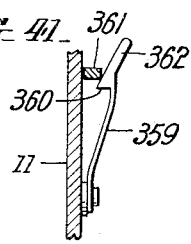

April 17, 1951 M. B. WILLIS 2,549,150
PRINTING DEVICE FOR PRODUCING GRAPHS, PRINTS OR THE LIKE
Filed Jan. 10, 1945 22 Sheets-Sheet 16
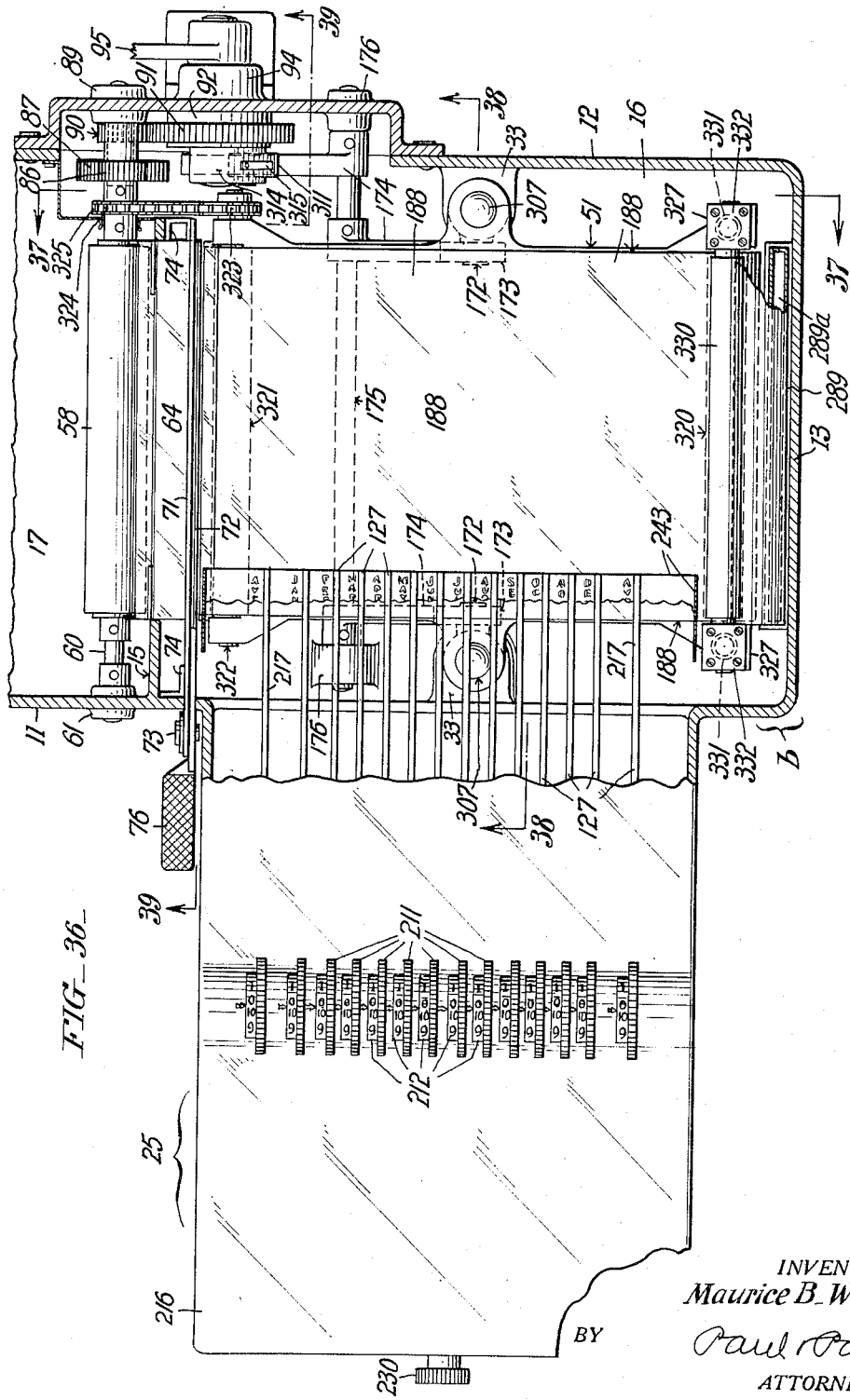
INVENTOR:
Maurice B. Willis,
BY Paul & Paul
ATTORNEYS.

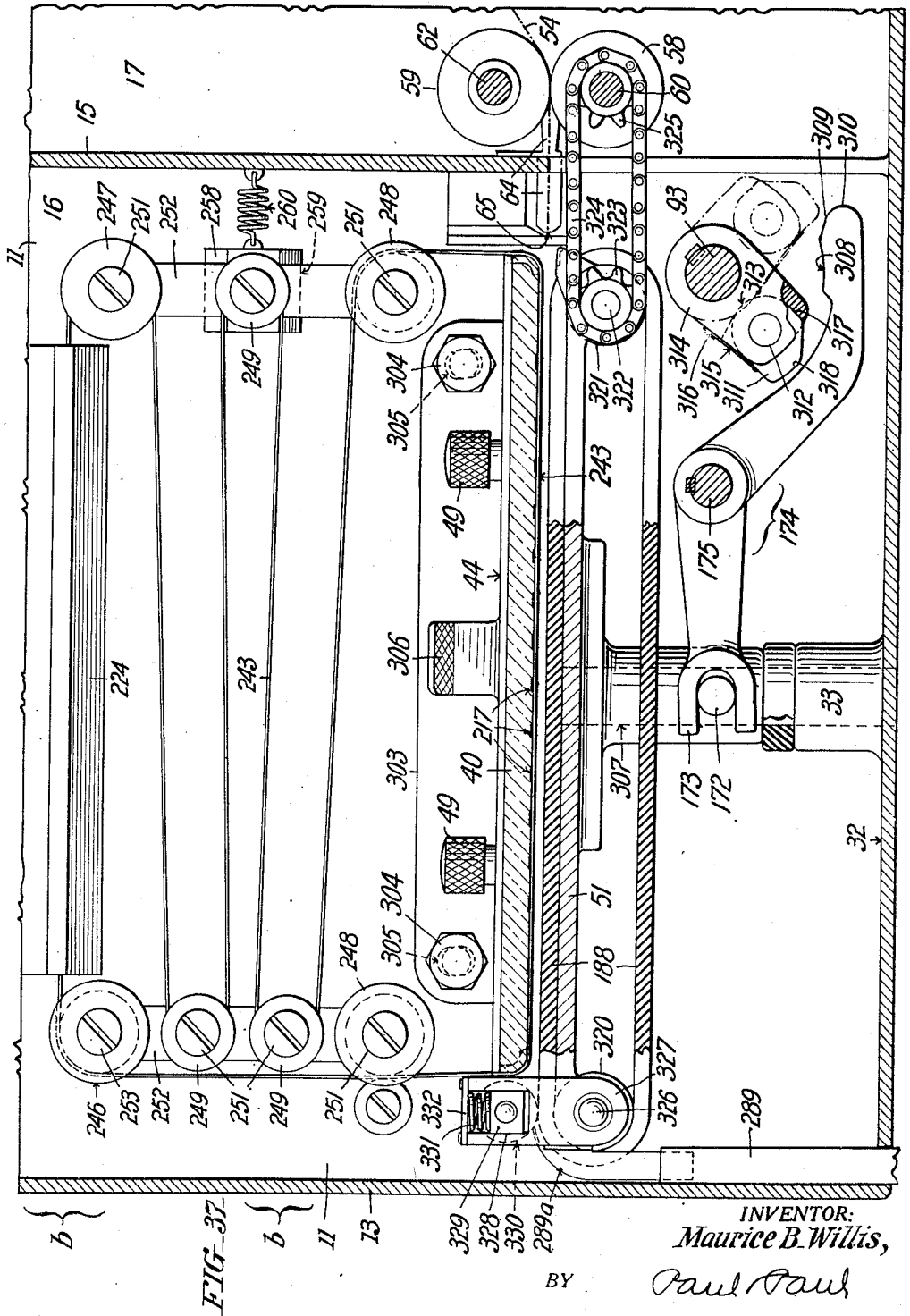

April 17, 1951 M. B. WILLIS 2,549,150
PRINTING DEVICE FOR PRODUCING GRAPHS, PRINTS OR THE LIKE
Filed Jan. 10, 1945 22 Sheets-Sheet 18
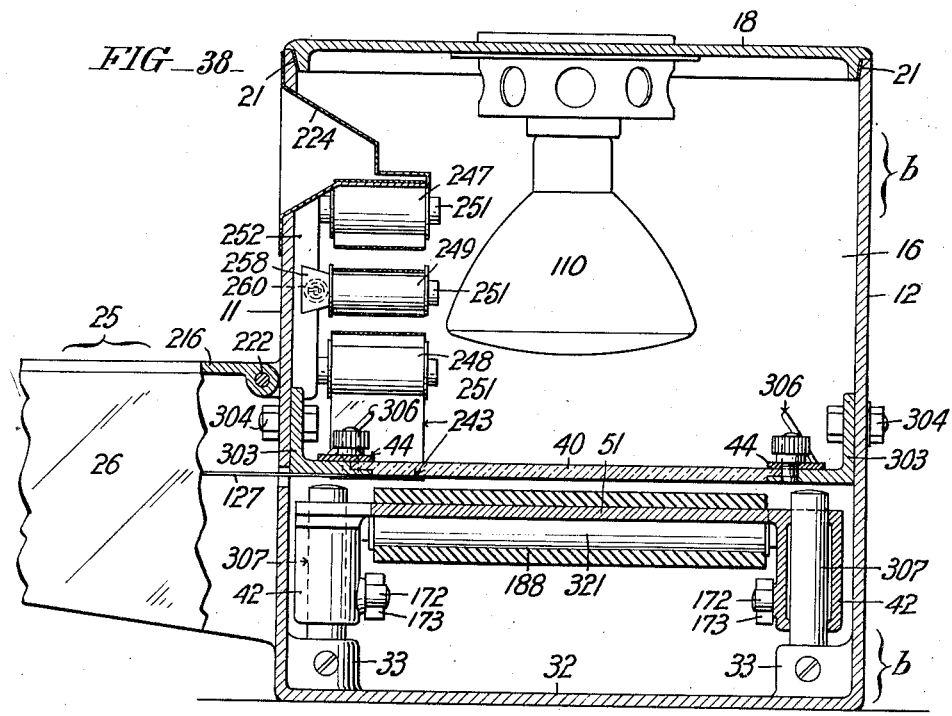
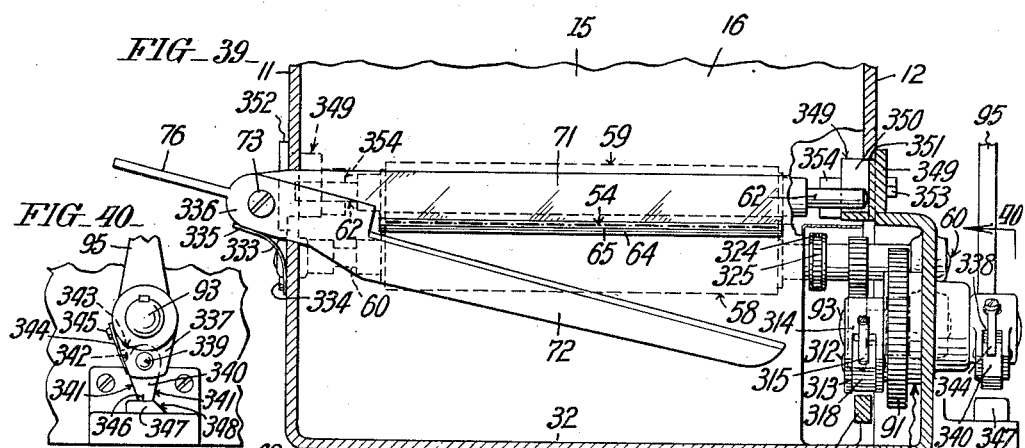
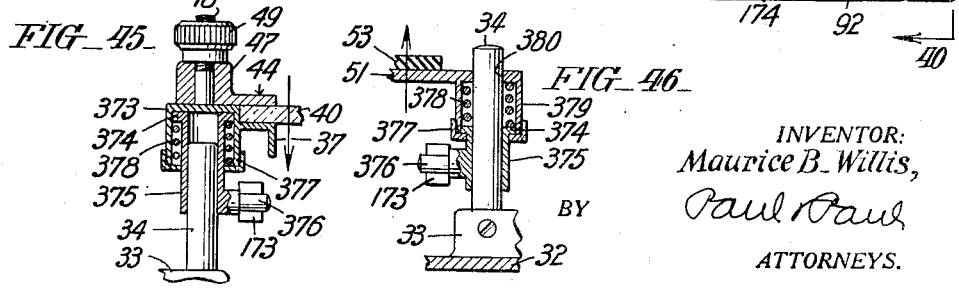
INVENTOR:
Maurice B. Willis,
BY Paul Paul
ATTORNEYS.

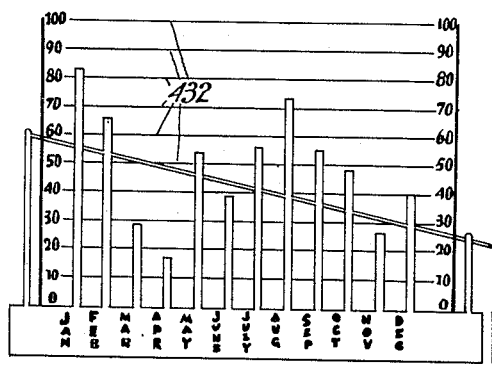
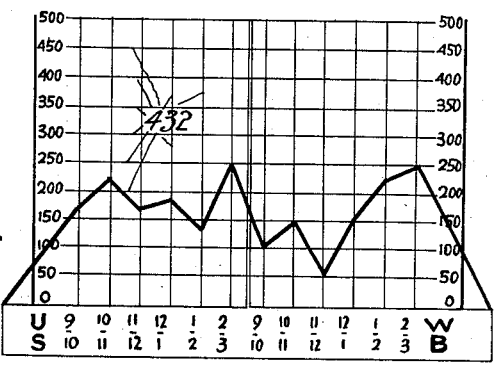
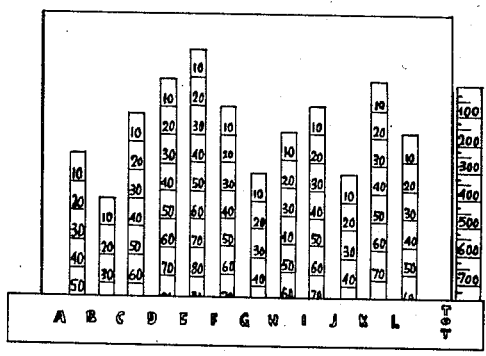
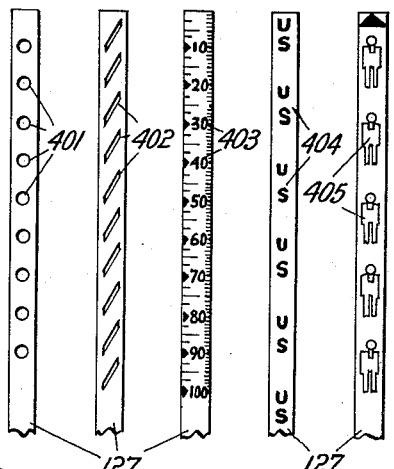
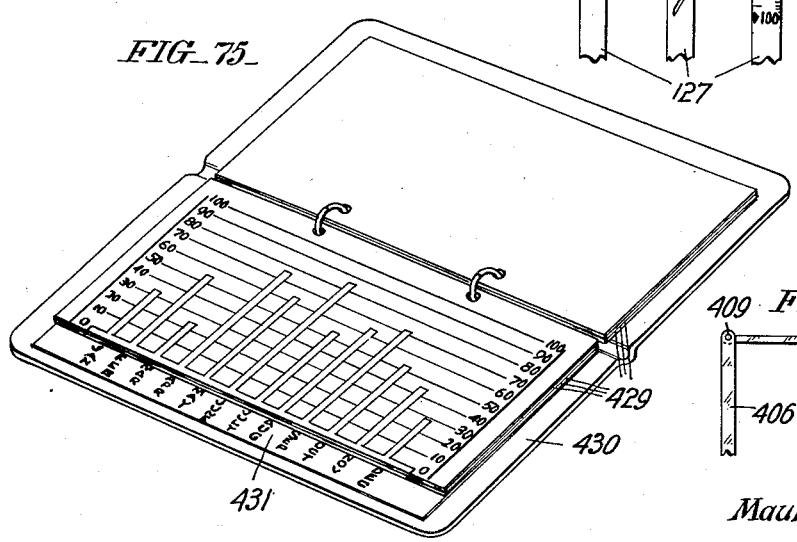
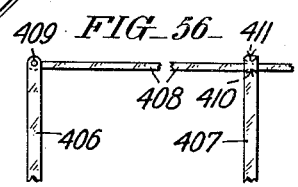

April 17, 1951 M. B. WILLIS 2,549,150
PRINTING DEVICE FOR PRODUCING GRAPHS, PRINTS OR THE LIKE
Filed Jan. 10, 1945 22 Sheets-Sheet 20
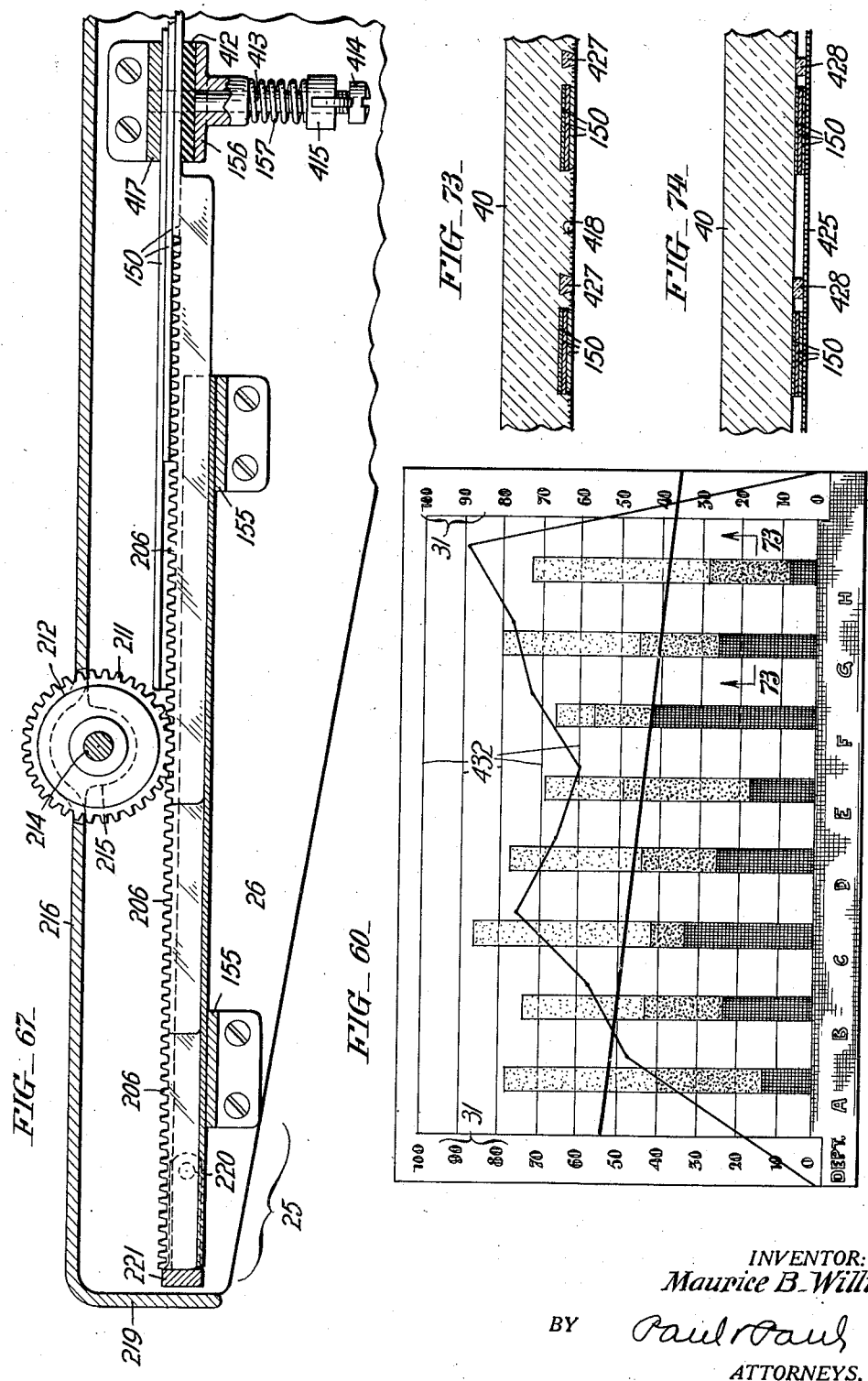
INVENTOR:
Maurice B. Willis,
BY Paul & Paul
ATTORNEYS.

April 17, 1951 M. B. WILLIS 2,549,150
PRINTING DEVICE FOR PRODUCING GRAPHS, PRINTS OR THE LIKE
Filed Jan. 10, 1945 22 Sheets-Sheet 21
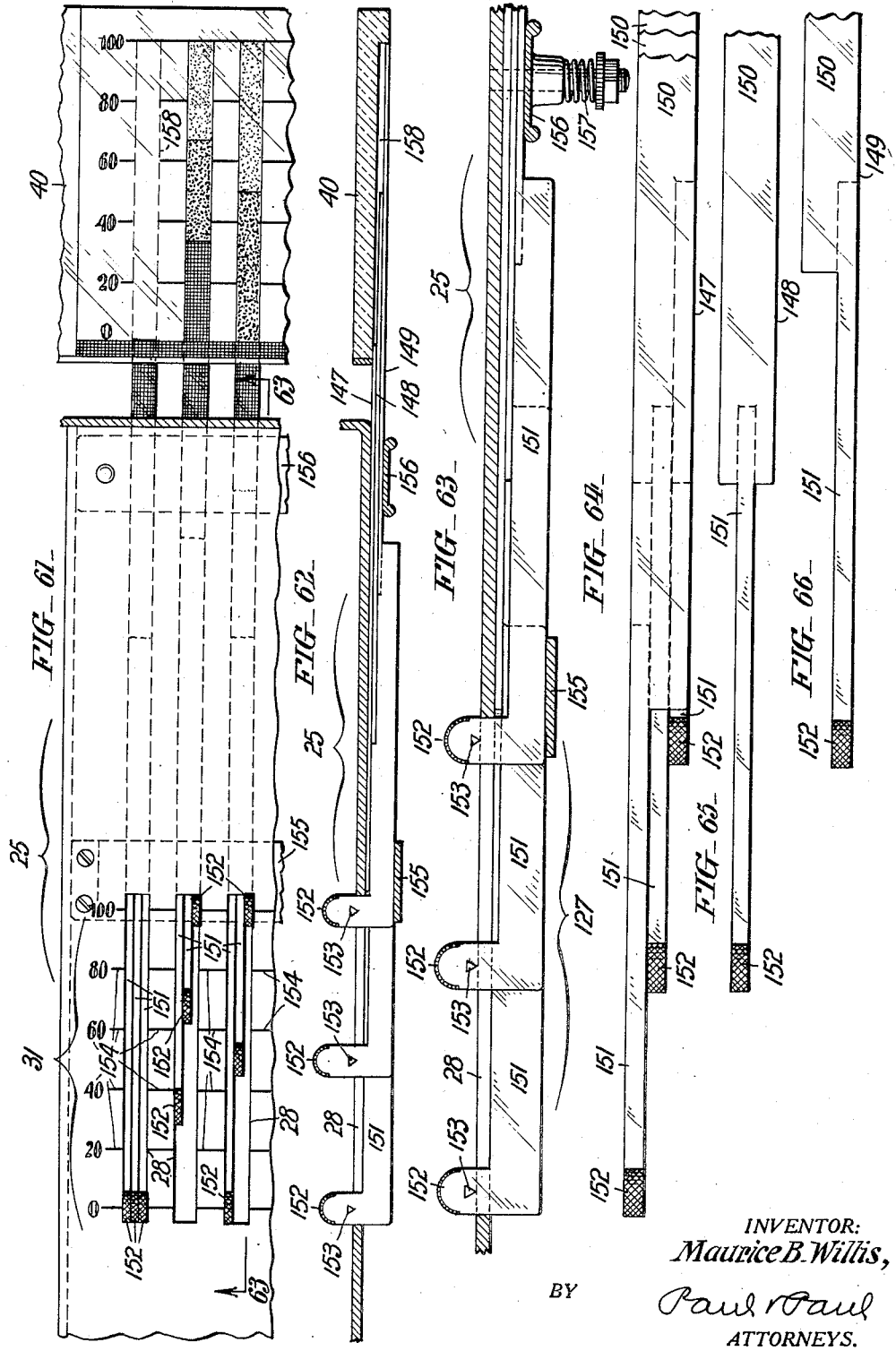
INVENTOR:
Maurice B. Willis,
BY
Paul & Paul
ATTORNEYS.

April 17, 1951    M. B. WILLIS    2,549,150
PRINTING DEVICE FOR PRODUCING GRAPHS, PRINTS OR THE LIKE
Filed Jan. 10, 1945    22 Sheets-Sheet 22
FIG_68_
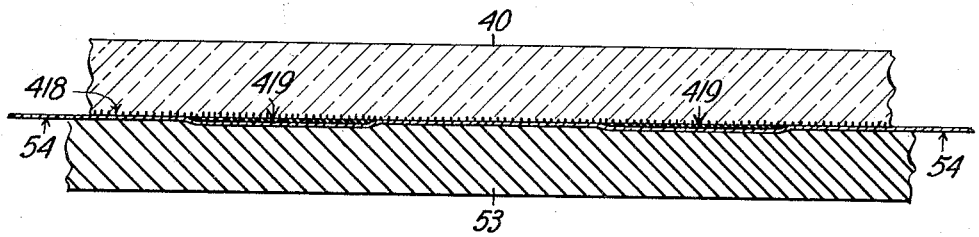
FIG_69_
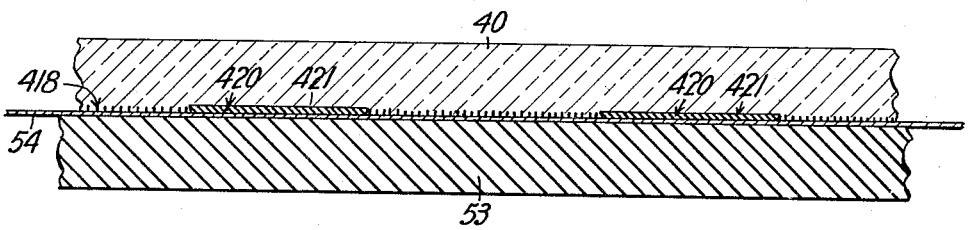
FIG_70_
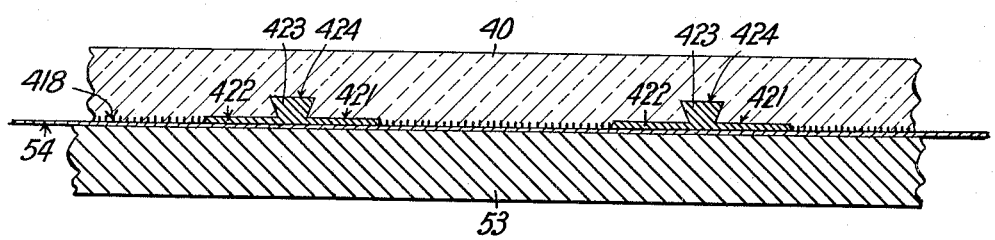
FIG_71_
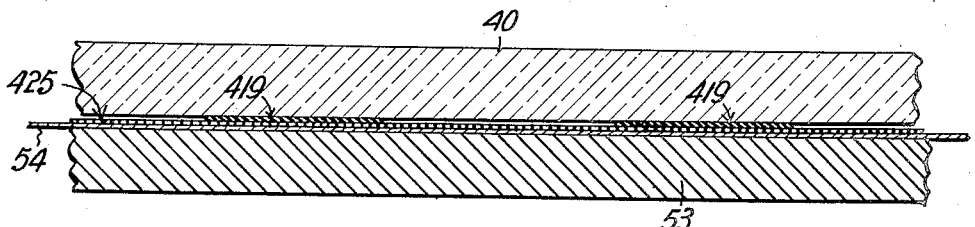
FIG_72_
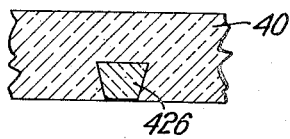
INVENTOR:
Maurice B. Willis,
BY
Paul & Paul
ATTORNEYS.

Patented Apr. 17, 1951

2,549,150

UNITED STATES PATENT OFFICE 2,549,150

PRINTING DEVICE FOR PRODUCING GRAPHS, PRINTS, OR THE LIKE

Maurice B. Willis, Haddonfield, N. J., assignor, by direct and mesne assignments, of one-third to Charles C. Morrison and one-third to Richard Kubach, both of Philadelphia, Pa.

Application January 10, 1945, Serial No. 572,157

12 Claims. (Cl. 346—24)

This invention has reference, in its broader concept, to means for making graphs, charts, prints and the like, by producing on suitable media, characters, symbols, broken lines and so forth, or selective combinations thereof, to indicate or define different values or percentages, by aid of which the extents or volumes of various things may be readily and quickly ascertained for comparison without recourse to computation.

In business, for instance, figures are brought together for a comprehensive study of the progress and results of that business, and to determine by comparison if all conditions such as the costs, profits, sales, advertising, production, service and growth, are satisfactory. Such comparison of conditions may be made by any known methods such as corresponding days, months, and/or years; tons, units, dollar volume, or sections, etc.; also against competition, national volume and trends. Figures being noncomparable make it necessary to convert the human mind into either an adding, subtracting, dividing or multiplying machine, to get the proper analytical picture represented by such figures; and while the brain is the greatest filing cabinet known, it is beyond all human possibility to utilize the brain to the extent of remembering all of the figures necessary for complete analytical purposes. A chart of graphic illustration executed in proportion to differences as represented by figures, etc. presents to an executive a comparable clear and proportionate graphic guide or picture of quantities or results and requires much less time for analysis, without the necessity of mathematical genius or ability, eye strain or brain fatigue, to absorb quickly the full extent of results and values.

Heretofore the preparation of charts executed by hand has required long periods of time in their preparation and a thorough knowledge of the art thus consuming considerable valuable time, during which the executive did not know how the business stood, or where concentration of effort was needed. This resulted not only in heavy costs for preparation of the charts, but could cause considerable losses to the business through lack of knowledge of past results quick enough.

A fundamental aim of this invention is to render it possible for a low paid employee of any office to set-up the necessary figures or information by graphic illustration within a short period of time, after such figures and information are released by the various departments, whereby an executive can have the graphic illustrations or charts for analysis, guidance and reference almost immediately.

Another object is to provide an improved machine, wherein the manner of producing the record is effected in a novel manner; or, in other words, the means for making the imprints or images on the chart, or the like, are retainable in operating position, with resultant provision for continuous operation when desirable or expedient.

A further object is to provide a machine of the species, noted in the preceding paragraph, in which means carrying lines, characters and symbols are interchangeable, with a greatly extended range for setting-up the type of graphs, charts, prints and the like which can be made by said machine.

A still further object is the provision of a machine of the character specified which is capable of producing negative and positive prints either by a dry or a wet process as desired.

Still another object is the provision of a machine of the character above specified in which graphs, charts, prints and the like, of different sizes, and also to cover a determined period of time, can be expeditiously made.

Yet another object of this invention is the provision of a machine of the foregoing indicated type which is comparatively simple in construction, thoroughly reliable and effective in its operation; that is readily and easily accessible for inspection, or for variable arrangement of the image-producing means, repair or the making of replacements; and which positively ensures accuracy in the graphs, charts, prints and the like produced thereby.

The foregoing and other objects, with ancillary advantages, are, preferably, attained in practice by making use of a fully light-proof housing containing a roll of sensitized paper which is propelled by friction, belt or roller drive over a removable and elevatable resilient base on which the background such as lines, percentages, symbols or any other known reference characters may be inscribed, printed or placed thereon.

The invention further involves unitary or multiple transparent, translucent or opaque bars bearing lines, plain or with symbols, legends, full or broken lines, or with any known reference characters thereon, which are movable forward so that a portion, or all of their length may extend under a basic form-plate to produce the bars of the chart. Each such bar is also in multiple, preferably one on top of the other, thereby making it possible to move them as a unit, or individually, whereby different shading in any one bar is attainable by regulation of the quantity or brilliance, of light passing therethrough either by dots, symbols thereon, or by the degree of translucency thereof.

In order that the invention may be clearly understood and carried into practice, the same will now be more particularly described in conjunction with the accompanying drawings, wherein like characters of reference are applied to the same or corresponding parts in all the figures; it being further understood that the typical embodiments illustrated are not conclusive, as the various features and elements of said embodiments may be otherwise combined, or substitutions made, without interfering with the general results obtained. Reference is, accordingly, to be had to the claims, herewith, for a definition of the limits and scope of my invention.

In the drawings:

Fig. 1, Sheet 1, is a perspective view of one form of my improved printing machine, the same being manually operable.

Fig. 2, Sheet 2, is a central longitudinal section of the same, and drawn to a larger scale for better illustration of important details.

Fig. 3, Sheet 3, is a plan section taken approximately as indicated by the broken line and angled-arrows 3—3 in Fig. 2.

Fig. 4, Sheet 4, is a vertical cross-section taken substantially as indicated by the staggered line and arrows 4—4 in Fig. 3.

Fig. 5 is a similar cross-section, taken approximately as indicated by the staggered line 5—5 in Fig. 3, illustrating a shearing mechanism later on explained in detail.

Fig. 6, Sheet 2, is a fragmentary outside elevation taken within the limits of the angled-arrows 6—6 below the right-hand portion of Fig. 3 and showing, by dot-and-dash or broken lines, a drive mechanism hereinafter explained.

Fig. 7, Sheet 4, is a fragmentary vertical section on the staggered plane 7—7 in Fig. 3, but drawn to a larger scale for clearer illustration.

Fig. 8 is a fragmentary plan view taken as indicated by the angled-arrows 8—8 in Fig. 5.

Fig. 9, Sheet 2, is a fragmentary section corresponding with a portion of Fig. 2, but drawn to larger scale, and showing certain parts in co-active relation.

Fig. 10, Sheet 3, is an enlarged detail view, taken intermediate the angled-arrows 10—10 in Fig. 3, of a push-button actuator means later on fully clarified.

Fig. 11, Sheet 1, is a fragmentary sectional view similar to Fig. 9, but illustrating a modification thereof.

Fig. 12, Sheet 5, is an exploded perspective view of a plate-holder frame included in the structure of Figs. 1, 2 and 3 more particularly.

Fig. 13, Sheet 6, is a perspective view, similar to Fig. 1, of a modified form of the invention.

Fig. 14 is a staggered vertical cross-section taken approximately as indicated by the angled-arrows 14—14 in Figs. 15 and 16.

Fig. 15, Sheet 7, is a staggered plan section, taken as indicated by the broken lines and arrows 15—15 in Fig. 16.

Fig. 16, Sheet 8, is a vertical longitudinal section taken substantially as indicated by the angled-arrows 16—16 in Fig. 13.

Figs. 17—20 inclusive are fragmentary detail sections of a drive-shaft and clutch means, in different positions, for controlling the feeding forward of paper and affecting co-related movement of other parts of associated mechanism hereinafter more particularly described.

Fig. 21, Sheet 9, is a detail plan view of a bed-plate and co-active endless conveyer with a portion thereof broken out to better disclose otherwise hidden parts.

Fig. 22 is an elevation of the same, or as viewed from below the preceding figure, with a portion at the left-hand in section for purpose of clarity.

Fig. 23, Sheet 10, is a perspective view of a further embodiment of this invention.

Fig. 24, Sheet 11, is an enlarged scale approximately-central longitudinal mid-section of the same, with a portion at the left-hand side broken away to bring the view within the illustrative limits of said sheet.

Fig. 25, Sheet 12, is a part sectional view taken approximately on the plane designated by the angled-arrows 25—25 in Fig. 24.

Fig. 26, Sheet 13, is a vertical cross-section taken on the plane indicated by the angled-arrows 26—26 in Figs. 24 and 25.

Fig. 27 is a fragmentary local cross-section taken as indicated by the angled-arrows 27—27 in Figs. 24 and 25.

Fig. 28, Sheet 14, is a fragmentary longitudinal vertical section taken approximately as indicated by the angled-arrows 28—28 in Fig. 25.

Fig. 29, Sheet 5, is a fragmentary local cross-section taken as indicated by the angled-arrows 29—29 in Figs. 24, 25 and 28, and showing a light-proofing guide panel with an associated cutting means; and Fig. 30 is a top plan view of the same.

Fig. 31, Sheet 10, is a fragmentary side elevation and part section viewed from below, of the left-hand half-portion of Fig. 25, and showing how a shelf-like cover can be raised to expose the toothed-bars or racks therebelow, for quick removal, as hereinafter more particularly described.

Fig. 32, Sheet 11, is a fragmentary larger scale top plan view of indicator gears associated with and rotatable to shift the toothed-bars or racks, referred to and shown in Fig. 31, as desired.

Fig. 33 is a vertical similar scale, cross-section taken as indicated by the angled-arrows 33—33 at the left hand in Fig. 24.

Fig. 34, Sheet 12, is a larger-scale fragmentary detail-section of a release-and-arresting device controlling the racks and indicator gears, above referred to; said section being taken as indicated by the arrows 34—34 in Fig. 25.

Fig. 35, Sheet 15, is a plan section of still another form of the invention.

Fig. 36, Sheet 16, is a somewhat similar plan section but taken at a lower level of the machine to better illustrate a table and endless conveyor bed with associated means for driving said conveyer, as well as means for raising said bed.

Fig. 37, Sheet 17, is a fragmentary section, drawn to a larger scale, taken approximately as indicated by the angled-arrows 37—37 in Figs. 35 and 36.

Fig. 38, Sheet 18, is a fragmentary vertical cross-section of the machine taken locally as indicated by the angled-arrows 38—38 in Figs. 35 and 36.

Fig. 39 is a vertical cross-section taken approximately as indicated by the broken line and arrows 39—39 in Fig. 36, to better show the drive-mechanism, shear means, and a guide-panel, all as hereinafter particularly described.

Fig. 40 is a fragmentary elevation as viewed substantially within the limits of the angled-arrows 40—40 at the right hand side of Fig. 39; said view serving to better clarify means, of contact for exposure, controlling a hand-lever when in the vertical, or pressing, position of rearward clockwise movement.

Fig. 41, Sheet 15, is a fragmentary cross-section, taken as indicated by the angled-arrows 41—41 in Fig. 35, to show a latch means later on particularly explained.

Fig. 42, Sheet 9, is a fragmentary plan view of a preferred tension means, for idle-rolls, hereinafter fully explained.

Fig. 43 is an elevation of the same or as viewed from below the preceding Figure; and Fig. 44 is a section on the plane 44—44 of Fig. 42.

Fig. 45, Sheet 18, is a detail view, partly in elevation and mainly in section, of a supporting standard, hereinafter fully described; and Fig. 46 is a similar view to the preceding of another supporting standard also later on again referred to.

Fig. 47, Sheet 14, is a fragmentary part elevation and part sectional view of a strip-controlling means, hereinafter particularly explained; and Fig. 48 is a side view thereof, or as seen when looking from the right-hand toward the left of Fig. 47.

Fig. 49, Sheet 9, is a detail elevation of a push-button device, enabling easy removal and interchange of certain shiftable bars, hereinafter fully described.

Fig. 50 is a similar view to the preceding but taken at right angles thereto; and Fig. 51 is a plan section taken approximately as indicated by the angled-arrows 51—51 in Fig. 49.

Fig. 52, Sheet, 10, is a larger scale fragmentary view of strip material as used in the type of machine illustrated by Fig. 23, as well as Fig. 34 and following figures and the functional character of which, is hereinafter fully set forth.

Fig. 53, Sheet 1, is a detail view showing how a chart may be produced with the form of my invention more particularly illustrated in Figs. 1 to 12 inclusive; and Fig. 54 is a larger scale sectional view of a spring-influenced reeling device employed for lightly tensioning a flexible indicator element later on fully explained; said sectional view being taken as indicated by the angled-arrows 54—54 in Fig. 53.

Fig. 55, Sheet 19, is a fragmentary view illustrative of a series of transparent, or thin metal, bars bearing symbols or characters such as are used in the art of photo-copying, graph-analysis, as well as in the making of graphs, charts, and the like, in single or contrasting colors.

Fig. 56 is a broken fragmentary view of spaced bars with an associated average-defining element, hereinafter fully clarified.

Fig. 57 is a view depicting how a combination bar and straight-average chart may be produced by aid of the means shown in Figs. 55 and 56, more particularly.

Fig. 58 is a view similar to the preceding of a chart as produced with the means shown by Figs. 53 and 54.

Fig. 59 is a corresponding view illustrative of how numerical values are read off from a base or zero line.

Fig. 60, Sheet 20, is a view of a chart producible in the machine of this invention by use of bars having contrasting areas, and also indicating the top-trends of differing values, as well as the straight averages thereof.

Fig. 61, Sheet 21, is a fragmentary plan view of a cover or shelf element, with spaced series of adjoining and relatively-shiftable button-operable bars arranged in differing relative extension.

Fig. 62 is an elevation of the lower series of bars shown in Fig. 61, and indicating how they are closely compacted or pressed upward in planar relation.

Fig. 63 is a longitudinal section, taken approximately as indicated by the arrows 63—63 in Fig. 61, but drawn to a larger scale for the purpose of clearer illustration.

Fig. 64 is a fragmentary top plan view of one of the series of button operable bars.

Fig. 65 is a similar view of the middle bar shown in Fig. 64; and

Fig. 66 is a like view of the lower bar of Fig. 64.

Fig. 67, Sheet 20, is a larger scale view somewhat similar to Fig. 63, but including more detail, as well as being illustrative of the respective rack-bars and how they are operable by indicator gears such as shown in Figs. 32 and 33.

Fig. 68, Sheet 22, is an enlarged-scale fragmentary sectional view showing one type of printing bars disposed below a transparent covering plate, and with an underlying rubber bed.

Fig. 69 is a like view to the preceding figure with the bars located in spaced grooves in the transparent plate.

Fig. 70 is a similar view to the preceding figure with the bars additionally anchored in position by dovetail projections.

Fig. 71 is a corresponding view to the preceding but showing how the bars may slide between a transparent charted foil and the transparent plate.

Fig. 72 is a fragmentary detail section illustrating how a colored transparent bar may be used in connection with the transparent plate of Figs. 68-71 inclusive.

Fig. 73, Sheet 20, is a fragmentary cross-sectional view of the area arrangement shown by Fig. 60, said section being taken as indicated by the arrows 73—73 therein.

Fig. 74 is a similar view to the preceding of the foil arrangement shown by Fig. 71; and Fig. 75, Sheet 19, is a perspective view of a loose-leaf binder for charts produced in accordance with Fig. 57 but without the base strip.

In describing the forms of this invention exemplified by the drawings herewith, specific terms will be employed for the sake of clarity, but it is to be understood the scope of said invention is not thereby limited; and that such terms are intended to embrace all equivalents which perform the same function for an analogous purpose.

Referring more in detail to the drawings and firstly to the form of my invention shown by Figs. 1 to 12, more particularly, the reference character *a* comprehensively designates a lower rectangular hollow casing or box, preferably made of suitable sheet material to include spaced side, front and rear walls 1, 2, 3 and 4 respectively, which are reinforced by corner angle sections 5 and an upper similar section that defines a supporting lip or flange 6 at the top. This casing or box *a* is conveniently provided at the bottom with projecting apertured lugs 7 whereby it can be positionally located and secured by suitable means, not shown. In addition, the box $a$ is preferably fitted with a removable liquid-proof drawer 8, serviceable as a developing receptacle, hereinafter again referred to, said receptacle $a$ being supported by runners 9 at the top, and having at the front a handle 10 whereby it can be drawn out or moved in.

Mounted on the casing or box $a$ is a conformably-shaped housing $b$ which is preferably attached to the flange 6, in any desirable manner, said housing including side, front and back walls, 11, 12, 13, and 14 respectively; with a partition 15 separating the same into front and rear sections 16, 17. The front section 16 or, as hereinafter called the printing-compartment, is closed-in at the top by a hood 18, and the rear section or magazine 17 is similarly provided with a cover 19; while said hood and cover have a common hinge-connection 20 preferably along the upper edge of the partition 15, see Figs. 1 and 2. It is also to be noted that the closure edges of both the hood 18 and cover 19 are preferably fitted with suitable strip medium 21 to prevent ingress or egress of light to and from the respective sections 16, 17, for reasons later on set forth; while 22, 23 are suitable grasps whereby the hood 18 and cover 19 are, respectively, opened up and closed down.

Conveniently, although not essentially, attached to the front wall 13 of the housing $b$, as by securing means 24, is a bracket-shelf 25 of generally rectangular contour with a depending flange 26 along the sides and front, as well as apertured lateral projections 27, Figs. 2 and 3, through which the securing means 24 are engaged. This shelf 25 is provided with a series of spaced lengthwise slots 28, as well as bearing, adjacent said front wall 13, a holder 29 for an indicator strip 30, marked with desirable term indicia such, for example, as the conventional month-abbreviations shown for a period of one year; while adjoining each side edge of the shelf 25 there is suitably depicted parallel and corresponding columns of figures 31, preferably in multiples of ten from zero to one-hundred: although any other combinations of periodic or value characters may be employed, as required or desirable.

Within the printing compartment 16 of the housing $b$, and on the bottom 32 thereof, are pads or bosses 33 with rigid axis rods or stems 34 which afford vertical guidance for a holder-frame comprehensively designated $c$, in Fig. 12. This frame $c$, it will be observed from Figs. 4 and 12, more particularly, comprises a main member including spaced side portions 35 of somewhat Z-section with the web part 36 thereof horizontal and in a common plane, while the respective flanges 37 are vertical, a bar connection 38, at one end, and terminal stops 39 at the other end, said stops being above the common plane, so as to provide an adequate retainer means, against lateral shifting, for an opaque or transparent form-plate 40. Each side portion 35 of the holder-frame $c$ is also provided with a laterally projecting bracket section 41 including a relatively-dependent tubular section 42 for sliding coaction with the axis stems 34, above referred to, and whereby the frame $c$ is vertically guided as well as being maintained in a horizontal plane.

In order to elastically support the holder-frame $c$ helical springs 43 encircle the rigid stems 34 intermediate the bosses 33 and the lower confronting ends of the tubular sections 42; and to maintain the form-plate 40 in said frame, use is made of counterpart clamp bars 44, preferably having dependent offsets 45, for engagement with the outer face of the respective flanges 37. Each bar 44 embodies a lateral bracket section 46 having an orificed embossment 47 for passage therethrough of a screw-threaded rigid-stud extension 48 aligned, and preferably formed integral, with the axis of the bracket tubular section 42 of the associated side frame portion 36; whereas said bars 44 are clamped in active position by means of appropriate knurled thumb-nuts 49; while suitable gasket strip 50 may be interposed between said bars 44 and the confronting side edge portions of the form-plate 40.

Below the form-plate 40 is a stationary-base or platen 51, preferably of a size conformable with the area included by the inner confines defined by the flanges 37 of the holder-frame $c$, the same being rigidly supported by spaced uprights 52, conveniently secured to the printing compartment bottom 32; and said platen 51 has suitably affixed to its upper face a resilient material bed 53 preferably of rubber, over which sensitized paper 54 is intermittently progressed, as later on further explained.

A supply of the sensitized paper 54 is preferably carried on a reel 55 having an axis shaft 56, appropriately journaled by open-top inclined bearings 57—one only being indicated in Fig. 2—across the magazine compartment 17 with capacity for easy insertion and removal. Feeding of the sensitized paper 54 from the reel 55 is effected by means of a driven roll 58 and an idler roll 59, said driven roll 58 being fast on a shaft 60 journaled in bearings 61 across the magazine 17 while the idler roll 59 is freely rotative on a stationary shaft 62 mounted by bearings 63, Fig. 3, attached to the partition 15. From the rolls 58, 59 the sensitized paper 54 progresses into a light-proof plate member 64 having a planarly-related comparatively narrow slot 65, therethrough, and fitted in a conformatory opening in the partition 15 with projection to each side thereof, see Fig. 2; and then over the platen bed 53 to another pair of respectively driven and idler rolls 66, 67. The driven roll 66 is journaled by bearing 68 transversely across the printing compartment 16 proximate the front wall 13; while the idler roll 67 is provided with spaced circumferential grooves 261, for a purpose hereinafter set forth, and rotatively supported on a stationary shaft 69, fixed in bearings 70, attached to said front wall 13, which are similar to the bearings 63 aforesaid.

In order that a predetermined, or standard, length of the sensitized paper 54 as required or desired, may be severed from the supply either manually or automatically, the shearing means now to be described is employed; said means preferably comprising a stationary blade 71 with a relatively movable blade 72 pivoted thereto at 73. The stationary blade 71 is preferably horizontally sustained by channel-section elements 74 from the forward face of the partition 15, with its edge 75 approximately medially lengthwise of the narrow slot 65, see Fig. 5; while the relatively movable blade 72 is provided, exteriorly of the printing compartment 16, with a manipulator key 76 for manual operation as later on explained, and it is normally influenced into the open position of Fig. 5 by a recoil-spring 77 anchored by pins 78, 79 to the blades 71, 72 with the loop portion 80 between the adjoining channel-section element 74. Thus it will be readily apparent that a downward pressure on the key 76 will move the blade 72 upwards into paper-cutting relation with respect to the blade 71 when desirable; while both of said blades 71, 72 are preferably provided with end stops 81, 82 to limit movement of the blade 72 in opposition to the recoil action of the spring 77.

Operatively coordinating the rolls 58, 66 is a shaft 83, journaled in bearings 84, with associated bevel gears 85, whereby said rolls are rotatively turned in unison, by the drive mechanism shown to best advantage in Figs. 2, 3, 6 and 7. This mechanism, conveniently comprises a pinion 86, preferably fast on the right hand end portion of the shaft 60 of the driven roll 58, which is driven by a tooth gear 87, on a stub-shaft 88, Figs. 3 and 6, journaled in a bearing 89 from the side wall 12 of the magazine compartment 17. The stub-shaft 88 also carries a pinion 90 in mesh with a tooth-gear 91 forming the intermittently movable component of a conventional friction-clutch 92 keyed on an actuator 93, in a bearing 94, and rotative by a hand-lever 95 for imparting motion in one direction to the roll 58 through the train of gears 91, 90, 87 and 86 to the roll 58. Angular movement of the main hand-lever 95 with rotation of the clutch 92 is limited by fixed and adjustable stops 96, 97, respectively, in opposition to a tension spring 98 between a collar 99 on the actuator-shaft 93 and a suitable anchorage 100 on the bottom 32 of the housing b, all as readily understandable by those conversant with the art. Incidentally it is to be noted that the mechanism just described for driving the roll 58 is enclosed by a housing or shield 101 so as to effectively close-off the same from the printing compartment 16.

Referring again to the holder-frame c and in order to move the same with the form-plate 40 into active position over the platen 51 for transfer of an image of the matter set-up on said plate for production on the sensitized paper 54, each of the holder-frame sections 42 is provided with a laterally-projecting stud or the like 102, on which is engaged the slotted end 103 of an associated rock-lever 104. The respective rock-levers 104 are both fixed on a transverse shaft 105, journaled by bearings 106, Fig. 3, in the side walls 11, 12 of the printing compartment 16 and to one end of said shaft, conveniently the left-hand of the housing b, is secured a key or actuator 107, the up or clockwise movement whereof is limited by a stationary stop 108. Reverse or counter-clockwise-motion of the lever 107 serves to move the holder-frame c down over the sensitized paper 54, in opposition to the pressure of the springs 43, and also to shift an electric switch 109, effective to cause illumination, preferably, of a projector-flood or fluorescent lamp 110, conveniently dependent from the hood 18 of the printing compartment 16; or a plurality of such lamps may be used.

In order that the movable blade 72 may be synchronously actuated with descent of the holder-frame c, said blade is provided with a dependent clip-device 111, for engagement and upward movement by a tongue or wiper 112, carried by the lever arm 113 of a shiftable sleeve 114, splined on the transverse shaft 105 aforesaid and seen to best advantage in Figs. 5 and 8. This sleeve 114 also carries a coupler link 115 having at the free end a shifter-rod 116 slidably engaged through a tube-bearing 117 fixed in the housing wall 11, said bearing being provided with a pair of spaced notches 118, 119 the former of which may be termed the active one and the latter the inactive one. In other words both notches 118 and 119 are individually engageable by the tooth end 120 of a clutch element 121, carried by a knurled head 122 at the outer end of the shifter-rod 116. Thus it will be understood that when the parts 118, 120 are engaged, for example and as shown in Fig. 8, the wiper 112 engages with the clip-device 111 so that, as the shaft 105 is turned counter-clockwise, the movable blade 72 will be operated to cut-off the length of sensitized paper 54 in position on the platen bed 53; and also that when the shifter-rod 116 is pushed inwards, or to the right-hand of Fig. 8, the clutch element tooth 120 will be forced into arrestive engagement in the notch 119, whereby the wiper 112 is released from operative engagement with the device 111.

In connection with the driven and idler or ejector rolls 66, 67 there is provided a discharge chute embodying associated components 123, 124, see Figs. 2 and 9, the former of which 123 is in the form of a hood provided with laterally spaced inclined tongues 125, above a transverse slot 126 through which the serial sets of impression transmitting bars 127 are slidably guided; and said hood is removably clamped to the housing front wall by securing means 128; while the inclined tongues 125 serve to direct the leading end of the sensitized paper 54 into the bight of the ejector rolls 66, 67. The other chute component or deflector 124 is removably secured to the housing front wall 13, as best shown in Figs. 2 and 9, is held in place by securing means 129 to the front wall 13 aforesaid, and it embodies an overhang 130 with an arcual extension 131 embodying spaced tongues 132 shaped for contact with the ejector roll 67 to prevent the paper 54 being carried thereover, all as readily understandable on an examination of Fig. 9 more particularly.

In Fig. 11 there is shown a modification of the chute structure 123, 124 which is designed to discharge the paper 54, or severed lengths thereof, outwards relative to the housing b; accordingly all parts similar to those just described are correspondingly identified by like reference characters. It will be observed however that the component 124 has its upper edge portion angularly bent to define a transverse flange 133, which affords stationary support for an inclinedly-positioned rectangular-section tube 134 passed through an opening 135 in the front wall 13 of the housing b. This tube 134 has the outer end surroundingly beaded over at 136 to eliminate any sharp edge thereat; while the lower wall 137 is shaped at 138 for coaction with the driver roll 66 to positively ensure progression of the paper 54 as indicated by the associated arrow at the right-hand side of Fig. 11. The upper wall 139 of the tube 134 is extended at 140, such extension having a portion including spaced tongues 132 for coaction with the idler roll 67, and serving the same purpose above described.

In order that the last exposed section of the supply of sensitized paper 54 cut-off by the shear means 71, 72 may be progressed to and into the chute structure 123, 124, and to disengage the supply rollers 58, 59, so that feeding of paper into the printing chamber 16 is stopped, the left-hand or upper end of the driven roll shaft 141, Fig. 3, is fitted with a relatively slidable sleeve 142, rotative therewith by aid of a pin-and-slot connection 143, such sleeve having a push-head 144 at the outer end and being secured to, or formed as an integral part of the associated bevel gear 85, while said sleeve is outwardly-influenced by a suitable spring 145. Thus it will be seen that by pressing-in the head 144 the drive roll shaft 141 is releasable from actuation by the coordinating-shaft 83, and that said shaft 141 can then be rotated by a knurled knob 146 at its remote end, to thereby remove the above referred to last exposed section of the sensitized paper 54 in an obvious manner.

Turning now to the impression-transmitting bars 127, they are provided, see Figs. 3 and 10, each with a vertical button or manipulator projection 152 at the outer or free end thereof, said projection 152 having an indicator finger or spot 153 for desirable registration with progressive markings 154 intervening the indicator columns 31 on the upper or outer face of the shelf 25 hereinbefore referred to. Each manipulator projection 152 extends upward through an associated slot 28 in the shelf 25, and as seen in Fig. 10, are retained in slidable coaction with the associated shelf slot 28, by an adjustable friction grip 159, about a stud projection 160 and clamp-nut 161 below the said shelf; so that when the respective bars 127 are shifted, as desired, they are restrained against longitudinal movement during the impression making period, as later on fully set forth.

Normally the machine is equipped with single bars 127 as shown by Fig. 55, Sheet 19, but in addition there can be used "average bars" 406, 407, Figs. 56 and 57; as also a "top trend" means 391 as shown by Figs. 53 and 54 on Sheet 1; all of the species of my invention herein disclosed make use of the single bars 127, which can be moved by the button means 152 of Figs. 1–12, or 13–22; or by the gear means 206, 211 of Figs. 23–24 and 35–41. However, when three area charts such as is shown in Fig. 60, Sheet 20, are desired special sets of button moved bars such as shown by Figs. 61–65, Sheet 21, are preferably employed; or the rack-and-gear moved bars of Figs. 67 may also be used. More particularly Figs. 60 shows a combination of three area, top-trend and top-average trend bars; and to obtain such results there must also be employed in addition to the said bars the means of Figs. 56 or 54 in order to produce the chart depicted by said Fig. 60.

The several impression transmitting bars 127 are slidably sustained by a stationary bearer-bar 155 and a spaced presser-bar 156 both mounted below the shelf 25; while the latter bar 156 is upwardly influenced by an adjustable spring means 157 so that the respective bars 127 are restrained against relative flexure for intimate progression along complemental receiving-grooves 158 provided in the under-face of the form-plate 40. It is here noteworthy that the respective mover-sections 151 of the bar elements 147—149 are matingly arranged, relative to the strip portions 150 so that when nested together they form a bar of substantitally even width throughout the entire length thereof, whereby relative lateral shifting is effectively prevented. Each impression bar 127, or the associated elements 147—148 thereof, is individually, or may be collectively, retained in slidable coaction with the associated shelf slot 28, see Fig. 10, by an adjustable friction grip 159, about a stud projection 160 and clamp-nut 161 below the said shelf; so that when the respective bars or elements 147—149, is or are shifted, as desired, they are restrained against longitudinal movement during the impression making period, as later on fully set forth.

Referring to the embodiment of my invention, illustrated by Figs. 13–22 inclusive, all parts having equivalents in the preceding description are identified by like reference characters to obviate unnecessary repetitive explanation, and only the distinguishing features and constructive details will be explained.

It is to be first remarked that, in this form of the invention, the lower storage box *a* is dispensed with, while the housing *b* is provided with the apertured lugs 7, whereby the machine is securable to an appropriate base, and that said machine is more particularly designed for producing standard, as well as less than standard length sheets or charts, when the paper 54 is cut continuously; while said machine is fully automatic incidental to a pull-and-push movement of the main operating or hand-lever 95, all as later on fully clarified. In this type of machine the housing *b* is divided, as before set forth by the partition 15 into printing and magazine compartments 16, 17 respectively; while the bracket-shelf 21 is at one side, conveniently, although not essentially, the left-hand of said machine, so that a much greater number of the impression-transmitting bars 127 may be used and operate at an angle, or transversely relative to the direction of progressive movement of the sensitized paper 54.

The holder-frame *c* carrying the form-plate 40 is, as readily appreciated from Figs. 14–16, of much larger size and provided, proximate the angular corners thereof, with four bracket-sections 41 having dependent rigid stems 162, which are constrained to vertical movement by passage through apertured guide brackets 163 attached to or formed integral with the housing side walls 11, 12; while the associated and upwardly-influencing helical springs 43 are interposed between the upper faces of said brackets 163 and the spacedly confronting undersides of concentrically-related bosses 164 below the bracket-sections 41. Rigidly attached, as by set-screws or drift-pins *d*, Fig. 14, to the lower free ends of the guide stems 162 is a coordinating spider 165, having an axial hub 166, vertically movable on a stationary stem 167, adjustably screw-threaded into an embossment or pad 168, integral with the bottom 32 of the housing *b*, see Fig. 14. The stem 167 is formed with a head 169 to limit upward travel of the spider 165; while the lower end of said stem 167 is conveniently provided with a cross-cut 170 for application of suitable means for its axial adjustment. It is to be noted the bottom 32 of the housing *b* is, or may be provided with spaced holes 171 for a purpose later on explained.

The spider hub 166 is provided with diametrically opposed pins 172 engaged through the slotted fork ends 173 of a rock-lever 174 fast on a transverse shaft 175 journaled by bearings 176 in the side walls 11, 12 of the housing *b*. The rock-lever 174 includes a rearwardly-extending arm 177, the free end whereof is rounded at 178 for coaction with a cam 179 mounted on the actuator shaft 180 which is an extension of the shaft 93 of the friction-clutch 92 journaled in a bearing 191 within the printing compartment 16. The cam-device 179 has capacity for a limited rotary movement on the shaft 180 by aid of the key 181 in the friction-clutch 92 fast to the shaft 93 and projecting into a relatively wider slot 182 in the bore 183 of the clutch 92, see Figs. 17–20, and the purpose whereof will be hereinafter fully set forth, while the actuator-shaft 180 is in this manner operated from the main hand-lever 95, as before described in connection with Figs. 1 to 12.

Referring now to the platen 51, the same is sustained by spaced uprights 52 as hereinbefore explained, but it differs therefrom in that it is provided at the front and rear ends with relatively-shouldered or spaced bearings 184, 185 respectively. The rear bearings 185 afford journal support for an idler-roll 186 fast on an axial shaft 187; while the forward bearings 184 similarly journal a shaft, corresponding to shaft 141, and having fixed thereon a driven-roll 66; and about the rolls 186, 66 there is trained an endless belt 188, preferably of rubber and of substantial thickness. This belt 188 may have spaced and very shallow recesses 189 in its outer surface for a purpose later on set forth; while the drive-shaft 141 is operatively coordinated with the paper-feeding driven-roll 58. Incidentally the driven-roll 66, in this form of my invention, not only progresses the endless belt 188 but, in conjunction with the superjacent idler-roll 67, jointly serves to eject the printed paper or printed sheets of said paper 54 continuously through a chute-outlet 190 associated therewith and inclinedly fitted in the front wall 13 of the housing b, in an obvious manner.

A further distinction in the form of my invention under description is the employment of a series of spaced fluorescent lamps 192 removably supported preferably lengthwise above the form-plate 40, by appropriate bearing-bars 193, Figs. 14 and 16; while provisions are installed for ventilating and preventing overheating of the printing compartment 16. This means preferably consists of an upwardly-influenced horizontally rotative fan 194 journaled in a bearing 195, concentrically of an outlet 196 in the hood-closure 18 of the printing compartment 16; said fan being conveniently driven by a flexible-shaft 197 and connected pinion 198, supported by an angle-bracket 199 secured to the partition 15 separating the compartments 16, 17; whereas said pinion 198 is driven by a meshed gear 200 fast on the shaft 60 of the driven roll 58 at the feeding-in end of the sensitized paper 54. It will now be readily understood when the fan 194 is rotated that it may draw out the heated air from the compartment 16, by way of the cowl 201, or vice versa, such action being aided in either case by means of the spaced holes 171, hereinbefore mentioned, in the bottom 32 of the housing b. Or, as shown in Figs. 1 and 2, the projector-flood lamp 110 is preferably supported by a concentrically related annulus 202 over the outlet 196, and said annulus is provided with surroundingly spaced ventilating holes 203 for the escape of the heat thrown-off by said lamp.

Referring now to the species of machine shown by Figs. 23-34, all parts having equivalents in the preceding description will be correspondingly designated for the purpose of brevity; while it is to be remarked said machine is somewhat along the lines of the first form illustrated by Figs. 1 to 12 in that it includes a lower-box a and housing b, said housing, however, being provided with angle-brackets 204, Figs. 23 and 31, having attached legs 205 whereby the machine is supported at the desirable elevation above floor level.

In this form of the invention, which is preferably adapted for continuous operation, it will be observed that the impression or image transmitting bars 127 are individually provided with a toothed extension or rack 206, Figs. 24, 25 and 31, each such bar 127 being movable lengthwise by the rack operating in an associated channel-section guide 207, see Figs. 31 and 33 to best advantage; while all of the guides 207 are of uniform length and are sustained in stationary parallelism by spaced front and rear bearers 208, 209 rigidly attached by securing means 210 intermediate the depending side flange portions 26 of the shelf 25. The respective racks 206 are individually shiftable by an associated gear 211, each such gear including a concentric reduced portion 212 bearing the desirable indicia 213 for control of the movement of the bar 127 operated thereby; while all of the gears 211 are freely rotative on a common axis, shaft 214 mounted in bearings 215, transversely on and below a cover 216 forming the top of the shelf bracket 25, said shaft 214 being preferably at a level such that the reduced gear portions 212 register with the upper face of said cover, as clearly understandable on an examination of Figs. 31 and 33; whereas the circumferential teeth of the gears 211 project above the cover top surface, in a common plane and at a sufficient height for easy manipulation by the fingers of the machine operator.

Associated with the series of bars 127, in this form of my invention, there is shown a pair of spacedly-flanking, side or margin, bars 217, see Fig. 25, operative in channel-section bars 218, of greater length than the guides 217, while said guides 218 extend from the rear edge of the bearer 209 forwardly into proximity with the depending front flange 219 of the cover 216, whereat there is fulcrumed, by studs or the like 220, a stop-bar 221. It is to be particularly remarked, at this juncture, that the cover 216 is hinged at 222, Figs. 23, 25, and 31, to lugs 223 projecting outward from the front wall 13 of the housing b, below a sight opening 224, the purpose of which is later on clarified; while it is to be further noted that by provision of the hinged cover 216, that when the latter is raised or moved upwardly as indicated in Fig. 31, that the gears 211 are collectively disengaged from the related rack extensions 206, whereby the several impression bars 127 can be readily removed or interchanged as desired.

In connection with the several gears 211 and in order that the associated bars 127, when adjusted lengthwise as desired for impression transmission, may be so held for the making of "repeats," or a succession of like prints, there is provided an arrestor-bar 225 sliding in guide brackets 225a underneath the cover plate 216, Figs. 24 and 25, said bar preferably having a suitable resilient material pad 226, across its active face, so as to grip the gears 211 without damage thereto. To the forward side of the arrestor-bar 225 there is suitably secured an actuator-rod 227, the outer end whereof is screw-threaded at 228, for engagement in the bore of a sleeve 229, Fig. 34, said sleeve having a flange 229a for abutment against the inner face of the frontal flange 219 of the cover 216; while the sleeve 229 engages through and projects outwardly beyond the flange 219 for application thereto of a manipulator nut 230 and associated lock-screw 231 whereby the arrestor-bar 225 can be incrementally adjusted relative to the gears 211; in an obvious manner. An adjustable collar 232 is provided on the rod 227 to limit the releasing movement of the arrestor-bar 225.

The manipulator nut 230° and attached sleeve 229 are locked together by a set-screw 231 and it is to be understood that, when said nut 230 is turned clockwise, the rod 227 will be moved forward until the arrestor-bar 225 forcibly engages the gears 211 and restrains rotation thereof. To release the bar 225, it is obvious the nut 230 must be reversely rotated or turned counter-clockwise until the collar 232 abuts the flange 229a of the sleeve 229.

The form-plate 40 is, in this embodiment of the invention, raised by means of a rock-lever 174 that is somewhat similar to that described in connection with Figs. 13–22 excepting that the end rounding 178 is upwardly directed, see Fig. 28, for coaction with a cam 234, fast on the shaft 93 hereinbefore explained, that is operated by the hand-lever 95. Attention is drawn to the fact the movable blade 72 is downwardly influenced by a coil spring 235 anchored between a stud 236 on said blade and a second or spaced stud 237 secured to the partition 15. It is to be further noted that the movable-blade 72 is not pivoted to the stationary blade 71, in this form of the invention; also that the stationary blade 71 is rigidly sustained in spaced parallelism with the slot 65 by Z-section brackets 238, Figs. 29 and 30, Sheet 5; while the movable-blade 72 is vertically-guided relative to the stationary blade 71 in a recess or groove 239 formed in the latter, with its down movement limited by stop abutments 240, Fig. 29; and that said movable-blade 72 is provided with roundings 241 to reduce friction at the ends thereof, while the cutting-edge 242 of said blade is inclined below the horizontal to aid its severing action, see Fig. 29. The clip-device 111 is here influenced by a cam 112a shiftably connected to the shaft 180, see Figs. 29, 30, Sheet 5; Fig. 25, Sheet 12; and Fig. 28, Sheet 14. The cam 112a is secured to a sleeve 116a having a slot-and-pin connection with the actuator shaft 180. The means for shifting the cam 112a out of active position is similar to that shown and described with respect to Figs. 1–12.

Attention is now directed to a distinguishing feature of this form of the invention which involves what I preferably term an area strip 243, see Figs. 24, 25, 28 and more particularly Fig. 52, Sheet 10, bearing pre-determined end symbols 244 with intervening serial characters 245, the purpose of which will be later on explained. The strip 243, see Fig. 26, it will be observed, is of endless character and trained, preferably, about upper rollers 246, 247, lower rollers 248 and intervening smaller rollers 249, said rollers 246, 247 and 248 being operatively coupled by flexible-coordinators 250. All of the rollers 247 and 248 are freely rotative on stationary axes 251 secured to appropriate bearing portions 252 from the front wall 13 of the housing b, see Figs. 24 and 28 to best advantage. The axial shank 253 of the roller 246, Fig. 28, fits a bore 254 in the bearing portion 252, while said shank embodies a relatively reduced screw-threaded extension 255 to the free outer end whereof is rigidly secured a manipulator head 256, by aid of which the roller 246 can be rotated to progress the strip 243 as desired; while a wing-nut 257 is threaded on the extension 255 to lock the roller 246 against rotation after the strip 243 has been adjusted as desired. It is also to be remarked that one of the rollers 248, conveniently although not essentially, or that shown at the right-hand in Fig. 26 is sustained by a block 258 movable in a dovetail groove 259 transversely of the associated bearing portion 252, said block being under the influence of a spring 260. Thus it will be readily understood that the endless strip 243 is tensioned by the spring 260 and maintained sufficiently taut with respect to the several rollers 246, 247 and 248 for positive drive thereby in either direction. At this juncture it is to be noted that the strip 243 embodies two lengthwise sections or areas one bearing the symbols 244 and serial characters 245, and the other section being designated e with legendary markings m thereunder, see Figs. 24 and 52, while said area strip e is visible through the sight opening 224, Figs. 24 and 28, to thereby enable proper setting of corresponding markings and the like below the form-plate 40, without raising the cover 216 of the shelf 25. In this connection there is provided a small adjustable pointer f, Fig. 23, on the lower wall of the sight opening structure 224, for accuracy in alignment relative to the respective bars 127. It is also noteworthy that the sight opening 224 enables shifting of the strip 243 without opening up the housing b, while it also permits observation of the symbols 244 and characters 245 so that they are properly set for printing. Use of the strip 243 does away with the necessity of providing special holders 29 and strips 30, as shown in Fig. 1, since the symbols and characters 244, 245 are in line with the setting gears 211. As best seen and understood from Figs. 24 and 26, the strip 243 travels between the rollers 246 and 247, through a light-occluding guide g, with respect to the lamp 110; said guide having an upper shortened part of the same width as the strip 243. More specifically, whatever symbols and characters 244, 245 appear face up in respect to the form-plate 40 similarly appear in the sight opening 242, as readily understood by following the runs of strip 243 shown in Fig. 26. The strip 243 also includes a transparent section h at the right-hand side of Fig. 52 which is used when the symbols on the charts are not needed, such as charts for the looseleaf binder 430, Fig. 75, Sheet 19, inasmuch as said binder is provided with a symbol strip 431. Furthermore, when the machine, now being described, is used for ordinary printing (not charts) it enables use of the whole surface of the form-plate 40 as a printing area, while an opaque section i at the left hand of Fig. 52 serves to blank out margins for notations, etc.

Instead of employing the series of rollers 246, 247 and 248 with an endless strip 243, as just described; or where it is not desired to have such strip appear before the sight opening 224, use may be made of a length of strip 262, Figs. 47 and 48, Sheet 14, said strip having its ends secured to rotative spools 263 clamped on spaced spindles 264, by lock-washer and nut means 265, 266, with each such spindle having a wing-nut 257 and manipulator head 256 as before described. By releasing the wing-nuts 257 it will be apparent that the strip 262 can be varyingly wound from one to the other of the spools 263, as desired, for exposure of the requisite length of strip 262 below the form-plate 40, said strip length being positionally retained transversely by suitable guide clips 267 attached to the sides of said form-plate by securing means 268. Attention is directed to the fact that by provision of the guide clips 267, the form of strip 243 just described can be used on all forms of the machine herein described.

As hereinbefore mentioned this form of my invention is particularly well adapted for continuous operation, and in this connection the front and side walls 13 and 11, 12 of the housing b are preferably extended down below the bottom 32 so as to provide a front and spaced side flanges 269, 270 respectively, of a developing receptacle or tank 273. This tank 273 is provided with apertured lugs 274, one only being shown in Fig. 24, for pivotal connection by means 275 to a forward projection 276 of the adjoining side flange 270. Suitable means similar to the apertured lugs 277 of Fig. 26, may be provided to hold the tank 273 in active position below the housing bottom 32, and it will be clear that when such holding means is released, said tank 273 can be swung downwardly on the pivot means 275 into out of action location, as fragmentarily indicated by dot-and-dash lines at the left-hand lower side of Fig. 24.

Supported intermediate the housing side flanges 270 by transverse shafts 278, journaled in bearings 279 is a roller 280, driven from the shaft 141 by gearing 85a, Fig. 26, and plural idler rollers 281 respectively; said rollers 280, 281 being preferably coordinated by coiled-wire tension-drivers 282 in end grooves 283 of said rollers, Fig. 26; while the several rollers 280, 281 are provided with spaced circumferential grooves 284. Supported below, intermediate the side flanges 272 of the tank 273, by shafts 285 journaled in bearings 286 are similar idle rollers 287 operatively coordinated by tension-drives 288, said rollers being coactive with and in vertical registration below the rollers 280, 281 above described. Thus it will be readily understood that as the sensitized paper 54 is fed forward from the ejector rolls 66, 67 it will be directed down an associated guide chute 289 into contact with a curved deflector 290, at the bottom thereof, into the bight of the adjacent rollers 280, 287 for progression through the tank 273. The tension drives 282 engage along the side edges of the wet sensitized paper 54 and thereby serve as a positive aid in conveying or progression of said paper. In order that the sensitized paper 54 may be directly and evenly progressed without any "sag," intermediate the respectively coactive pairs of rollers 280, 287, and 281, 287, use is made of longitudinally directed guide bars 291 rigid with transverse channel-like bearers 292 firmly affixed to the bottom 293, of the tank 273, as readily understood on examination of Fig. 26, more particularly. It is also to be noted that the bars 291 have their upper edges rounded at 294 and that all of said bars are located medially in respect to the grooves 295 of the idlers 287 as well as the mating grooves 284 of the rollers 280, 281; while the upper edges of the roundings 294 are in a plane common to the running face of the idlers 287 excepting at the respective end portions of the bars 291 which are downwardly curved so as to positively offer no impedance whatsoever to smooth progression of the sensitized paper 54 through the tank 273. As the developed sensitized paper 54 leaves the bight of the last or right-hand set of rollers 281, 287 in Fig. 24 it passes upwardly over a series of freely rotative rollers 296, intermediate the side flanges 270 of the housing, with an inclined stationary guide-bar 297 to the discharge 298 as conventionally indicated by the arrow thereat. Supply and drain controls 299, 300 respectively, for the tank 273, have flexible connections 301; while a level maintaining outlet or overflow 302 is fitted to said tank 273, for use when a liquid developer is used therein.

Referring now to Figs. 35 to 41, Sheets 15–18, which show a still further form of the invention, it is to be first noted that the gear means 206, 211 for reciprocating the impression transmitting bars 127 previously described is herein illustrated as adapted to a machine somewhat of the species shown by Figs. 13–22; while the form-plate 40 is supported by side flanges 303, and securing means 304 engaged through slightly elongated slots 305, Fig. 37, in the side walls 11, 12 of the housing b, whereby provision is made for a limited degree of vertical adjustment of the level of said form-plate. To aid in raising or lowering the form-plate 40, the associated clamp-bars 44 are provided with opposed and inwardly-directed finger grasps 306, see Figs. 35 and 37.

The platen 51 is not resiliently influenced, in this form of the invention and is vertically guided, preferably, by a pair of rigid uprights 307 secured in bosses or pads 33 on the bottom 32 of the housing b as before described; while said platen is directly raised by a cranked or stepped lever 174, the rear end whereof is formed with a concaved pad 308 having an inclined-approach 309 from the rounded terminal part 310, said lever being fast on the transverse shaft 175, as before set forth. The lever 174 is intermittently actuated by a trip-cam 311 pivoted at 312 in the crotch 313 of a short bifurcated lever 314 fast on the friction-clutch shaft 93. Attention is directed to Fig. 37 wherein it will be seen that the trip-cam 311 is influenced by a suitable weak spring 315 secured to the lever 314 by means 316, so that the inner flat edge thereof is moved away from coaction with the confronting basal portion 317 of the crotch 313 when the shaft 93 is turned counter-clockwise whereby the obtusely-shaped active edge 318 of said trip-cam 311 will ride over the concaved pad 308 without moving the lever 174. On the other hand, when the drive or actuator-shaft 93 of the friction-clutch 92 is turned clockwise, it will swing the lever 314 from the dot-and-dash line position in Fig. 37, with incidental rocking of the trip-cam 311 on its pivot 312, as the toe 319 of said cam impacts the inclined approach 309; and after said toe 319 rides over the crest of the approach 309 the cam 314 will sweep the concaved pad 308, whereby the lever 174 will be rocked and thereby elevate the platen 51, through coaction of the parts 172, 173, as before set forth.

In this form of the invention the platen 51 is also fitted with an endless rubber belt 188 trained about end rollers 320 and 321, the shaft 322 of the latter being fitted with a sprocket 323 and endless chain 324 operatively co-ordinating the same, to a driver sprocket 325 fast on the shaft 60 of the paper feeding driven roll 58, so that progression of the belt 188 is correctly synchronized with advancement of the feed of the sensitized paper 54 into position for printing. Attention is also directed to the fact that the roller 320 is frictionally driven by the belt 188, and that the ends of its shaft 326 are journaled in appropriate bearings 327 forming a part of, or being rigidly mounted to the platen ends, Fig. 37. The bearings 327 are each slotted at 328 to afford vertical guidance for a relatively slidable bearing-block 329, which journal an upper or ejector roll 330 that is downwardly-influenced by a coil spring 331, intermediate the respective blocks 329 and associated cap-plates 332, in frictional relation with respect to the sensitized paper 54 and the endless belt 188, whereby the roll 330 is rotatively driven synchronously with progression of said endless belt, as readily understandable by those conversant with the art.

The movable blade 72, Fig. 39, of the means for cutting the sensitized paper 54 is pivoted to the stationary blade 71 at 73, and is manually operated by a finger-key 76, as before described, in opposition to a flexed spring-strip 333 attached to the housing side-wall 11 at 334 and said spring has a straight portion 335 coacting with the confronting lower edge of the blade butt-portion 336 in a manner to normally hold the blade 72 in the open or inactive position of said Fig. 39. Another feature, to be noted at this juncture, is that the main hand-lever 95, see Figs. 39 and 40, is preferably provided with an aligned rigid projection 337 beyond or below the actuator-shaft 93, said extension having with an angular recess or cut-out 338, in which is pivoted, by a pin 339, an arrestor-dog 340. It will be seen from Fig. 40 that the dog 340 is formed with an arcual end above the pivot pin 339 for coaction with the correspondingly rounded part of the cut-out 338, and tapering sides 341, one of the latter having an angularly related edge 342 for abutment against the complementarily inclined part 343 of said cut-out. The dog 340 is under the influence of a spring 344 secured to the projection 337 by suitable means 345, and it will be apparent that said dog 340 is afforded a limited degree of angular movement relative to the longitudinal median of the hand-lever 95 while the lever 95 can be held in vertical position by engagement of the active end 346 of the dog on top of the light-controlling switch or contact knob 347 by passage over the inclined or entrant face 348 of said knob; while said lever 95 is afforded limited capacity for independent angular movement in a counter-clockwise direction without disturbing the dog 340, or until the parts 342, 343 abut, in order that an interval is provided for the pressure and exposure phases in the operative cycle of the machine. In other words when the lever 95 is swung counter-clockwise for the paper-forwarding stroke the dog 341 just slides over the stop 347 without influencing it; whereas during the clockwise stroke of said lever the button or stop 347 is pressed downward, to its limit of movement when the lever 95, Fig. 40, is in the vertical position, which position should be held while the exposure time is counted with the parts 40, 53 pressing the paper 54 at the same time.

At this juncture it is well to note that full counter-clockwise movement of the hand-lever 95, as controlled by the stops 96, 97 effects feeding forward of the paper 54 for producing of the chart or the like; whereas during the reverse or clockwise swing of the hand-lever 95 the paper 54 is pressed between the form-plate 40 and platen bed 53 or belt 188, for transmission thereto of a copy or image of the previously set-up bars 127, with incidental switching-on of the light 110 or 192 to effect the "exposure," and also to cut-off the imaged section of the paper 54 is desired. In the first embodiment of the invention hereinbefore described, Figs. 1–12, while there is shown a hand-lever 95 and an actuator-key 107; the other forms described and shown by Figs. 13–41 may be defined as fully automatic inasmuch as all of the cyclic phases involved are effected during a to-and-fro actuation of the lever 95 only. For example, and referring to Figs. 23, 25 and 28, at the end of the counter-clockwise move of the hand-lever 95 the cam 234 by coaction with the rounded end 178 of the lever 173 effects pressing action between the parts 40, 54 and 53 with incidental exposure and cutting-off of the affected length of paper 54 by aid of the means shown in Figs. 17–20. It is further noteworthy that actual advancement of the paper 54 does not actually commence concurrently with initial counter-clockwise movement of the hand-lever 95. In other words, forward feeding of the paper 54 into position for taking the impression must take place while the parts 40, 53 are apart; and on reference to Figs. 17–20 it will be readily understood that the normal or starting position of the hand-lever 95 is as graphically indicated at x in Fig. 20, or as shown in Figs. 13 and 23 by full line perspective illustration. From Figs. 19 and 20, it will be readily seen that the arcual extent of the slot 182 in the hub 183 in respect to that of the clutch actuator-key 181 ensures that the first part of the counter-clockwise movement of the lever 95 is idle and cuts-off the light as well as releasing the pressure between the parts 40, 53; such actions being conjointly effected by aid of the switch 109 and springs 43. Otherwise expressed the friction clutch 92 does not commence to function or become active to forward paper 54 until the parts 181, 183 are in the position of Fig. 17; the idle or return movement of said clutch being indicated in Fig. 18; while the pressing and exposure phase of the operation taken place during that part of the return stroke of the lever 95 is conventionally indicated by the arrow in Fig. 19 with the associated legend, which is in opposition to the influence of the parts 43 and 109 as before mentioned.

In the form of the invention shown by Figs. 35–41 the friction clutch 92 is not provided with a cut-out or slot, such as 182, in the hub 183, while the pressing phase of the operation takes place at substantially the middle of the clockwise or return stroke of the hand-lever 95, when the latter is in vertical position with the lever 314 and trip-cam 311 correspondingly aligned or when the end 346 of the arrester-dog 340 actively engages the top of the switch button 347. At the same time the means of Fig. 40, previously described, functions to enable the pressing and exposure phases to take place as aforesaid, as the light 110 is concurrently switched on. The operator holds the lever 95 in the vertical position just explained for the desired period of exposure, and then continues movement thereof clockwise to the normal starting position, or with the parts 174, 340 in the full-line position of Fig. 37 and the part 311 clear of the switch 347 so that the light 110 is out. During the counter-clockwise movement of the lever 95, or when feeding the paper 54 forward, the arrestor-dog 340 simply rides over the switch stop 347 as the spring 344 has but little strength and hence the stop 347 is not disturbed with no current furnished to the light 110.

In the described forms of machine the paper 54, or the exposed and cut-off paper, or the desired number of charts have been printed, there is provided a release means for freeing the idler-roll 59 from coaction with the companion or driven-roll 58. This means, as best understood from Figs. 35 and 39 comprises mounting the ends of the shaft 62 of the roll 59 in vertically slotted bearings 349, with interposition of suitable anti-friction material sleeves 350, while said bearings are fitted through conformatory openings 351 in the side walls 11, 12 of the housing b and they are rigidly held thereto by end flanges 352 and securing means 353. Engaging the respective ends of the shaft 62, adjacent the inner ends of the bearings 349, are the forked ends 354 of levers 355 fixedly mounted on a common shaft 356, freely journaled in bearings 357 on the housing side walls 11, 12 aforesaid, while one end of the shaft 62, preferably at the left-hand side of the machine, is extended outwards and has fixed thereon a manipulator key 358, whereby the shaft 356 can be partly turned in a clockwise direction to elevate the roll 59 from coaction with the roller 58, in an obvious manner. To hold the manipulator key 358 in position, with the roller 59 elevated as first explained use is made of an associated spring latch 359, Fig. 41, having a nose projection 360 which, when the key 358 is depressed, will snap over the shank 361 of said key and firmly hold the latter down, while the key 358 can be readily released by outward pressure against the head 362 of the latch 359. It should be here mentioned that, as shown in Fig. 37, Sheet 17, the first section 289a of the ejector chute 289 is fixedly secured to the bearing 327 or movable with it, and that said section telescopes into the chute 289 from where the paper 54 passes thus into a tank or other suitable receptacle to be developed.

Referring now to Figs. 42–44, Sheet 9, which show suitable means for spring tensioning any one or each of the idle-rolls 59, 67, 281, 287, 320 and 330, when it is undesirable to rely on the weight thereof and, for example only, the following description will be made with respect to the ejector roll 67. The shaft 69 of the roll 67 is freely journaled in a rectangular block 363, said block being vertically guided in an open bottom cut-out 364 in a hanger 365 attachable to the adjoining wall 13, for instance, as by securing means 366; while the block 363 has an enlargement providing flanking projections 367 which lap the confronting face of the hanger 365, with the adjoining end of the roller 67 engaging said enlargement, whereby relative axial shifting of the parts 67, 363 is prevented. The hanger 365 is provided in its upper part with a screw-threaded bore 368 having a plain extension 369 of a diameter equal to the width of the cut-out 364. In the aligned bore 368 and extension 369, and seating on the block 363 is a helical-spring 370, of determined gauge, the influence of which can be regulated by a screw-stud 371, and having a cross-cut 372 in its top, said screw-stud being engaged in the threaded bore 369, for imposition of the desired pressure on the roll 67 and whereby the requisite tension can be accurately set, as readily understandable by those conversant with the art.

To provide for unlimited elastic pressure in excess of the elasticity of the rubber bed 53, or that of the belt 188, there is shown in Figs. 45 and 46, Sheet 18, alternative types of means for imposing elastic pressure on the form-plate 49 when it is to move downwards, and for the platen 51 when the latter is to move up; it is to be remarked that the means of Fig. 45 comprises a cylindrical cup 373 in which the flange 374 of a shiftable sleeve 375 slidably engages. This sleeve 375 is provided at its lower part with a shouldered radial projection 376 for engagement by the forked end 173 of means, such as the rock-lever 174 hereinbefore explained. The cup 373 is closed-in at the lower end by a suitable cap 377, while intermediate said cap and the sleeve flange 374 is a buffer spring 378; while the other parts are identified by reference characters previously employed to obviate the necessity for unnecessary repetitive explanation. In the form of means shown by Fig. 46 the platen 51 is provided with an inverted cylindrical cup 379 having a concentric aperture 380 in its top through which the guide stem 34 projects, while the buffer spring 378 is located in said cup 379 intermediate the upper end thereof and the flange 374 of the sleeve 375. In all other respects the other parts have equivalents in the showing of Fig. 45 and they are correspondingly identified.

Referring now to Figs. 49–51, Sheet 9, there is shown a modified form of shifter means, to that previouslly described in connection with Figs. 3 and 10 more particularly. This modified form of shifter means is preferably designed for facilitating interchange of the individual impression-transmitting bars 127, and it comprises a shank 381 having a knurled-head 382, a diametrically-enlarged discous portion 383 for seating on the shelf 25, and a screw-threaded section 384; while the shank 381 adjoining the discous portion 383, is provided with parallel flats 385 for slidable passage along the shelf slots 28. It is to be particularly noted that the slots 28 are open ended at the outer part of the shelf 25, see Fig. 49, so that the shifter means can be readily withdrawn thereat, and interchanged with another, as before mentioned; while a stop-bar 386 is clamped across the shelf 25, as by wing-headed clamp screws 387, to normally limit the outward retraction of the series of bars 127, in an obvious manner. Fitting freely on the screw-threaded section 384 of the shank 381 is a special spring-grip 388 of undulate formation transversely, with one end longitudinally split to define a tongue 389, which is of a width for upward entry into the associated slot 28 as clearly understandable from Fig. 49 more particularly. The spring 388, it will be seen, serves as a friction grip for normally holding the shank 381 stationary, and it is held in place by means of a knurled nut 390 after the proximate end of the bar 127 has been applied to the shank 381.

Referring now to Figs. 53 and 54, Sheet 1, which show a means for producing a top trend line on the chart—in many cases a very suitable form of trending—and it can be used with or without the bars 127, by a reasonably tough but flexible element or cord such as surgeon's thread or catgut, it is to be first noted that the inner ends of the respective transparent bars 127 are individually provided with an eye 392 through which said cord is threaded so that it lies below the transparent form-plate 49. The respective portions of the cord 391 from the terminal ends are passed upwardly through appropriately shaped apertures 393, to prevent frictional abrasion thereof, in the form-plate 49, and are wound on spools 394, each of which is mounted on a stationary axis member 395, screw threaded at 396 into the clamp-bar 44. Each such spool 394 is under the action of a recoil-spring 397, having one end affixed to said spool at 398 and the other end secured to the axis member 395 at 399, hence it will be readily understood that as the respective bars 127 are moved forwards, or inwardly relative to the machine that the cord 391 will be varyingly drawn from off the spools 394, with resultant formation on the chart of the desired trend line when the chart is printed; while 400 is a protective covering or closure cap for both the spool 394 as well as the recoil-spring 397. Fig. 56, Sheet 19, also shows a chart produced by the aforesaid means and indicating, for example, the top trend of hourly stock market fluctuations of well known stocks, and without use of the bars 127.

Fig. 55, Sheet 19, illustrates a series of different types of thin metal or transparent impression transmitting bars 127 for variable usage in any one of the species of machines hereinbefore described and, as read from left to right, have spaced holes or black circles 401, slots 402, a scale of determined values 403, stock market or other characters 404, and symbols 405 such as are used in graph-science to depict an amount of certain values, business values in general, stock-market volumes of business, names and innumerable other commercial or statistical values.

Fig. 56, Sheet 19, shows an alternative means whereby a straight average or "limit," or "danger-line" indication on the chart may be produced in union with the regular bars 127 of this invention, said means comprising a pair of parallel flat bars 406, 407, shiftable lengthwise, with an associated narrower transversely related bar 408 pivoted at 409 to the inner end of the bar 406, for example, and extended through a slot or aperture 410 preferably having opposed half-roundings 411, to accommodate easy angular shifting of the bar 408 relative to the bars 406, 407; as readily appreciated on reference to said Fig. 56, while Fig. 57 shows a product of such arrangement.

Fig. 59, Sheet 19, shows a chart decidedly original, and in many cases very useful, in that it not only depicts the trend, but gives the result of each bar on the base for direct reading, also the total of all bars, at the right, as produced with bars 127 having markings 403, see Fig. 55. Here also the facilities for straight averages, Fig. 56, or the top-trend 53—54 can be added if deemed advisable. At this juncture it is noteworthy that the bars 127 are the direct numerical values 403 and results to be read off the base, which is very useful when the machine of this invention is "harnessed" to a source of recording by electrical, or electronic, means as known to those familiar with this art; for instance to machines or presses that record the output, by receiving a forward move of the bars 127 for every piece or article put out, by such machine or press, as well as recording the running time thereof.

Fig. 60, Sheet 20, illustrates a different kind of chart where the impression created by the bars 127 are of contrasting shadings—and is effected by the use of special strip bars 150 nested together in pluralities of two or more; while the product of three such combined bars is shown in said Fig. 60.

Referring now more particularly to Figs. 61–66, Sheet 21, it is to be remarked that each spaced series of such bars 150 conveniently includes three relatively shiftable elements 147, 148 and 149. These elements 147, 148 and 149 are, preferably, made of transparent, translucent, or opaque material to each embody an impression-imparting horizontally-disposed strip-portion 150, and an angularly-related extension or mover-section 151 with a vertical button or manipulator 152 extending above the surface of the table or shelf 25 and, on examination of Figs. 61, 62, and 63 it will be readily understood that when said projections are in nested relation, as shown at the left-hand end of the upper slot 28 in Fig. 61 that the bars 127 are in the inactive position, whereas in the spaced slots 28 therebelow, said bars have been varyingly shifted towards the right-hand or into active position, as hereinafter fully clarified. The several sets of spaced bars 127 are slidably sustained by a stationary bearer-bar 155 and a spaced presser-bar 153 both mounted below the shelf 25; while the latter bar 156 is upwardly influenced by adjustable spring means 157, so that the respective bar superposed strip-portions 150 are restrained against relative flexure for intimate progression along complemental receiving-grooves 158, Fig. 63, provided in the underface of the form-plate 40. It is here noteworthy that the respective mover-sections 151 of the bar elements 147—149 are matingly arranged, relative to the strip portions 150 so that when nested together they form a bar of substantially even width throughout the entire length thereof, whereby relative lateral shifting is effectively prevented.

It is to be further remarked that so far there has only been described bars such as 127, Fig. 55, Sheet 19, having associated trend means 391, Figs. 53, 54, Sheet 1; or with a straight average means 406—408, Figs. 56 and 57, Sheet 19. Or, the combination of means evidenced by Fig. 58, Sheet 19, that illustrates the use of average bars at the left and right hand thereof; as well as the use of numerals and a marginal or side scale of values as indicated in Fig. 59, Sheet 19. However, particular importance is attached to the use of the three-area strip-bars 150 and means for production of the "optimum" chart of Fig. 60, which not only gives or indicates the top-trends but also the straight average; all of which will be again referred to describing the operative cycles of this invention.

When the strip impression-imparting bars 150 are operated by the rack and gear means 206, 211, is it preferable that the adjustable pressure-bar 156, be faced on its upper surface with a rubber pad 412, see Fig. 67, and that the lower end of stem 413 be provided with a head 414 and arrestor or wing-nut 415. It is to be further observed that with this arrangement plural stationary bearer-bars 155 are arranged below the racks 206; also that a stationary hold-down or abutment-bar 417 is located above the bars 150, and towards which the adjustable bearer-bar 156 is upwardly influenced in an obvious manner.

Figs. 68–74, Sheets 22 and 20, illustrate various manners in which the transparent form-plate 40 may be initially prepared for specific purposes as hereinafter fully explained. In Fig. 68 and following figures the markings of the permanent lines of the chart-base is indicated by a stippled line 418, plain bars 419 movable thereacross; Fig. 69 shows how plain bars 420 may be operated in complementary slightly dovetailed grooves 421; Fig. 70 illustrates how bars 422 embodying lengthwise dovetail projections 423 can be used in complementary composite grooves 421, 424; while Fig. 71 indicates how plain bars 419 can be used with a transparent plastic chart 425 over the sensitized paper 54, Fig. 72 indicates a dovetail section bar 426 that is of the same material as the plate 40 and colored or provided with a layer of metal or plastic the underside of which is flush with the plate to be used in the form-plate 40; while Figs. 73 and 74 respectively show how top-trend bars 427, 428 like those shown in Fig. 53, Sheet 1, can be spacedly arranged alongside the multiple three area bars 150, as depicted in Figs. 60–67, to produce a chart as shown in Fig. 60 in combination with straight average trend-bars.

Fig. 75, Sheet 19, shows how loose-leaf charts 429 can be removably arranged in a suitable folder 430, said charts being prepared with, or as shown without, the marginal or base serial characters or other desirable indicia 431 which are arranged on the base of the binder serving for all charts bound in, and eliminating the roller-strip arrangement, as mentioned before.

In the first form of the invention illustrated more particularly by Figs. 1–12 it is to be noted that the transverse lines 432, and suitable under graduations, not shown, Figs. 3, 15, 25, 35, 53, 57, 58, 60 and 75 are, preferably, permanently depicted on the form-plate 40, as well as repetitions of the marginal columns 31; or said lines and columns may be on a foil or transparent medium such as the plastic element 425, Fig. 71. In other words the lines 432 and columns 31 may be constant, whereas the transparent strip 243 is changeable as required, while it may have any other markings thereon, such as months, days, weeks, districts, managers' names, and products, etc. depending entirely upon the business, industry and so forth with which this invention is to be associated. Furthermore, some firms, government departments, brokers and insurance houses may require frequent change in the type of characters and symbols which can be readily effected as before set forth in connection with Figs. 23–34 more particularly, by aid of the sight opening 224, strip 243 and associated rollers 246—249; while the adjustable pointer f, Fig. 23, takes care of any shrinkage or extension of the strip 243 insofar as enabling accurate setting of the markings m thereon, Fig. 52, relative to the movable bars 127 or 150, so that whatever appears in the sight opening 224 correspondingly shows on the form-plate 40; obviously where no changing of the characters or symbols 404, 405 is required, the strip 243 or its equivalent can be dispensed with; while it is equally apparent that any other graph-science indicia may be made on the bars 150, without sacrificing any of the unlimited scope for usage of this invention.

In use and referring to the species of this invention, as shown by Figs. 1–12, more particularly, as well as assuming that a roll of sensitized paper 54 is placed in the magazine compartment 17, with its free end engaged between the feeding-in rolls 58, 59 and in abutment with the cutting blades 71, 72, or after such blades have trimmed-off the leading edge square by manipulation of the key 76, as hereinbefore explained, and that a suitable developer 433, Fig. 2, is in the receptacle or drawer 8, whereupon the machine will be ready for operation. The operator first shifts the selected, or all of, the bars 127 or 150 forwards, by aid of the associated buttons or manipulators 152, to the desired and differential extents, as controlled by the respective marginal columns values 31, while said shifted bars are stationarily held in the adjusted positions by the friction means 159, 160, 161; or, in other words, all of the bars are individually and definitely "set" ready for impression-transmittal. The operator next swings the hand-lever 95 counter-clockwise, from the fixed stop 96 to the adjustable stop 97, which, through the gears 91, 90, 87 and 86, Figs. 3 and 6, drives the roll 58 and by coaction with the roll 59 feeds a length of the paper 54 along the platen bed 53 into the bight of the ejector rolls 66, 67, whereby said length of paper is positioned ready for taking the impression or printing, such action of paper feeding being aided by the means 60, 85, shaft 83, gears 85 and driven roll 66.

The lever 95 is then returned clockwise to the initial position or into abutment with the fixed or stationary stop 96 and during such stroke the friction-clutch 92 remains undisturbed. Downward pressure is next applied to the actuator-key 107, which effects, inter alia, rocking of the lever 104 counter-clockwise with concurrent descent of the form-plate 40 and activation of the cutter-blade 72 to sever the length of paper 54 overlying the bed 53 from the reel 55; and as said lever engages the adjustable stop or switch-button 97 an electric circuit, not shown, is closed to illuminate the lamp 110, for the desirable or necessary exposure period; while the actuator-key 107 is held down for the time necessary exposure count or otherwise and then released, whereupon illumination of the lamp 110 ceases, while the form-plate 40 ascends under expansive action of its influencing springs 43 to normal location. It is to be noted that before the cutter-blade 72 functions, the leading end of the strip of paper 54 to be severed from supply has entered the bight of the ejector rolls 66, 67, so as to be in position for progression down the chute 123, into the developer medium 433; all as readily understandable by those acquainted with the related arts. Furthermore, and as previously set forth, when required synchronous actuation of the cutter-blade 72 may be stopped by simply pushing-in the head 122 of shifter-rod 116 to release the lever arm 113 and wiper 112 from coactive engagement with the device 111 of said blade 72.

Referring now to the other three forms of this invention as illustrated and described in connection with Figs. 13–22, 23–34 and 35–41, respectively, they are each in the main operated incident to a single to-and-fro swing of the hand-lever 95; or, in other words, the counter-clockwise swing of said lever between the movement limiting stops 96, 97 effects the feeding-forward of the paper 54, as above explained, whereas the clockwise or return swing of the lever 95 from the stop 97 to the stop 96 effects the pressing, time-exposure and cutting phases of the operation. More specifically, with respect to Figs. 13–22 a counter-clockwise swing of the hand-lever 95 from the stop 96 feeds the sensitized paper 54, from the supply reel 55, onto and along the endless belt 188 until the leading end thereof approaches the bight of the ejector-rolls 66, 67, as before explained, and with stoppage of further counter-clockwise movement of the lever 95 by abutment thereof against the stop 97; while the friction-clutch 92 has been also actuated for the purpose previously described. On commencement of the return or clockwise swing of the hand-lever 95 the shaft 180 and cam-device 179 will be correspondingly turned with incidental rocking of the lever 174 and pulling down of the form-plate 40 into "pressing" coaction with the belt 188 and platen 51; and, as said lever 95 engages the switch-button 109 of the stop-device 96, it will be readily seen and understood from Fig. 19 that the "pressing" and "exposing" phases of the operation are effected, as conventionally indicated by the respective heavy and light angularly-related dot-and-dash lines and associated arrow. On the other hand, it will be observed, after the hand-lever has been held for the requisite time-exposure period, it will be remarked on an examination of Fig. 20, immediately the holding-pressure is released thereupon, that said lever will be automatically restored to the initial position of Fig. 17 under the joint action of the springs 43 and recoil influence of the switch button 109, whereby the light 110 is cut-out and pressure of the form-plate released.

The operation of the species of this invention shown by Figs. 23–34 and Figs. 35–41 will be quite clear from the immediately preceding disclosure with respect to Figs. 13–22 hence a detailed explanation thereof is deemed unnecessary, excepting to emphasize the setting of the impression-transmitting bars 127 by aid of the rack and gear means 206, 211 and the locking of the latter means by aid of the rod 227 arrestor-bar means 226, 227; as well as progression of the impressed chart through the developing tank 273 by aid of the means 289—288 and 291, 292, as hereinbefore clearly set forth. In addition particular attention is directed to the use of the transparent strip 243 and related means for operating the same as and for the purposes previously specified.

From the foregoing it will be readily understood that by my invention there is provided a novel type of chart or print producing machine which includes a series for multiple, transparent bars such as 127, having an associated flexible opaque or translucent material cord 391 strung through their end means 392, whereby said cord is guided by manipulation of the bars 127 to various extents over the basic form-plate 40 to represent and produce on the chart a graph line, across the full width of the chart to indicate the "top trends," and in addition thereto by use of the bar 408 and parallel bars 406, 407, a "natural average trend" may be concurrently indicated on the chart produced. In other words to complete the making of a chart the operator first adjusts the bars 127 or multiple strip bars 159 to the requisite lengths with variable movements of the opaque cord 391, and finally the side bars 406, 407 holding the transverse bar 408. After this setting of the several bars just recited either over or under the form-plate 40 and all of which is intermediate the lamp 110 or lamps 192 and the sensitized paper actuation of the lever 95 moves the parts 40 and 53 into engagement when illumination of said lamp produces the desired impression or images on the paper 54 for development as desired.

Still further, it is well known that in many business houses of kindred or like character, each one has an individual idea as to the best form of analysis and that in many cases they differ as to the basic form of chart production, and this invention is well adapted to meet such variations inasmuch as the form-plate 40 is easily removable for substitution by any other desired or preferred plate. Another distinctive feature of advantage inheres to the provision of the endless belt or transparent strip 243 which can be easily manipulated by the knob 256 to provide the desired set of base legends *m* or symbols 245.

Finally while there has been described and shown practical embodiments of this invention the same are not to be considered conclusive, inasmuch as numerous detail changes can be effected, as well as many variations in the general set up of the several parts or other combinations carried out, without departing from the spirit and scope of said invention as more particularly expressed in the following claims.

Having thus described my invention, I claim:

1. In a machine of the species described the combination of a housing including a partition to define front and rear closed-in sections, with a light-occluding passage device extending through said partition; a supply of image-receptive sheet medium in the rear section; cutter means in the housing front section proximate the confronting end of the light-occluding device; a platen having a resilient active surfacing with a coactive transparent form-plate in the front section; means for variably projecting graph indicia-bearing transparent or translucent bar-like elements into the housing along one face of the form-plate; means for progressing a definite length of the image-receptive sheet medium from the supply through the light-occluding passage-device intermediate the platen and form-plate, and cooperative means for subsequently ejecting said length of the sheet medium; means for exerting pressure between the form-plate and platen; light-projecting means for time exposure of the form-plate and indicia-bearing elements to impart an image of the latter onto the sheet medium; and mechanism whereby the sheet-feeding means, pressure-exerting means, light-exposure means, and ejector means are actuable in cyclic relation.

2. In a machine of the species described the combination of a housing including a partition separating the same into front and rear sections with a transversely related light-proof plate having a planarly-related narrow passage therethrough; a rotatable supply of image-receptive sheet material in the rear section; cutter means in the front section closely paralleling the adjoining end of the light-proof plate; a platen having a resilient bed thereon with an associated relatively-movable transparent form-plate in the front section; means for variably-projecting multiple transparent or translucent bar-like elements, bearing graph-indicia, into the front section along the lower surface of the form-plate; means for advancing a definite length of the image-receptive sheet material, from the rear section, through the plate narrow passage into the front section and over the surface of the platen bed; means operative to press the form-plate onto the sheet-material and platen bed; cooperative means for subsequently withdrawing said length of the sheet-material from off the platen bed; means for projecting light under timed exposure through the form-plate and indicia-bearing elements to impart an image of the latter to the sheet material; and mechanism including a friction-clutch actuable to control movement of the sheet material advancing means; the depression of the form-plate, the cutter means, the light projecting means, and the withdrawal of the impressed sheet, all in cyclic relation.

3. The invention of claim 2, wherein the friction-clutch is operated by a hand-lever at one side of the machine, stop means limit the movement of the hand-lever to an angle of approximately ninety-degrees; transition of said hand-lever in one direction serving to advance a length of the image-receptive sheet material from the housing rear section into the front section, and the reverse transition being an idle stroke.

4. The invention of claim 2 wherein the friction-clutch is at one side of the machine, and under operative control of a hand-lever limited to counter-clockwise and clockwise movements; and a recoil-influenced pivotal lever, at the opposite side of the machine, is operatively coordinated to the friction-clutch to effect cyclic depression of the form-plate, actuation of the cutter means, operation of the light-projecting means, and withdrawal of the impressed sheet.

5. The invention of claim 2 wherein the mechanism including the friction-clutch comprises a main actuator-shaft having a hand-lever fixed to one end thereof; a sleeve-like clutching member on said shaft having a lengthwise slot therethrough; a key in the shaft extending into the slot; spaced stop devices whereby movement of the hand-lever is angularly limited; one of said stops being axially adjustable to limit throw of the hand-lever in one direction; and the other of said stops including an outwardly influenced push-button whereby throw of the hand-lever in the reverse direction is restricted with follower return thereof to a neutral or inactive position.

6. The invention of claim 2, wherein the housing front and rear sections are provided with movable closures having a common pivotal connection, and the cover of the front section affords support for a projector flood-lamp having concentrically-related ventilator means for the escape of the heat emitted by said lamp.

7. The invention of claim 2 wherein the means for advancing the image-receptive sheet material comprises a driven roll and a coactive idler-roll; the light-proof plate extends from the forward bight of said rolls through and beyond the housing partition into close proximity with the cutter means; and the passage in said plate is of a cross-section for smooth progression of the sheet material therethrough onto the platen bed.

8. The invention of claim 2 wherein the means for withdrawing the image-impressed length of sheet material comprises a driven roll and an associated idler-roll; a chute encloses the rolls, and said chute communicates into a removable developing receptacle.

9. The invention of claim 2 wherein the rotatable supply of image-receptive sheet material is in the form of a roll of sensitized paper, and said roll is journaled in open-top inclined bearings in the housing rear section.

10. The invention of claim 2 wherein the cutter means comprises a stationary blade having its cutting edge located approximately medially across the light-proof plate passage, and a spring-influenced relatively movable blade; a sleeve-cam and wiper means operates the movable blade automatically; and a push-and-pull device serves to shift the cam and wiper means into and from cooperation with the movable blade respectively; and means whereby the movable blade may be manually operated.

11. The invention of claim 2, wherein the means for variably-projecting the multiple transparent or translucent bar-like elements, into the front section of the housing, comprises a bracket-shelf extending outward from the forward wall of said section; a corresponding multiple of spaced lengthwise slots in the shelf; means affording slidable guidance for the elements aforesaid below the bracket-shelf in alignment with the lengthwise slots; each bar-like element having a manipulator device operative along the registering shelf-slot; an adjustable friction-grip attached to each said device, coactive with the associated slot, whereby the individually moved bars are held at the desired projection below the form-plate; and a pointer means on each manipulator device for variable registration with suitable markings on the shelf to control the extent of projection of the associated bar-like element.

12. The invention of claim 2, wherein the transparent form-plate is provided with dependent tubular portions; rigid stems project upwards, from the bottom of the housing front section, and engage in the bore of the said form-plate tubular portions; springs about the rigid stems influence the form-plate upwards; and rock lever means, having pin and slot connection to the tubular portions, is operative to move the form-plate downwards in opposition to the springs aforesaid.

MAURICE B. WILLIS.

REFERENCES CITED

The following references are of record in the file of this patent:

UNITED STATES PATENTS

| Number | Name | Date |
| --- | --- | --- |
| 813,808 | Loryea | Feb. 27, 1906 |
| 978,126 | Busam | Dec. 6, 1910 |
| 1,159,126 | Stephenson | Nov. 2, 1915 |
| 1,210,804 | Howland | Jan. 2, 1917 |
| 1,246,579 | Fribley | Nov. 13, 1917 |
| 1,259,355 | Bunnell | Mar. 12, 1918 |
| 1,309,259 | Morichard | July 8, 1919 |
| 1,403,884 | Wynkoop | Jan. 17, 1922 |
| 1,407,357 | Tartara | Feb. 21, 1922 |
| 1,508,644 | Cassel | Sept. 16, 1924 |
| 1,554,466 | Stratton | Sept. 22, 1925 |
| 1,563,786 | Phelps | Dec. 1, 1925 |
| 1,711,333 | Swenson | Apr. 30, 1929 |
| 1,824,179 | Tisdale | Sept. 22, 1931 |
| 1,860,763 | Adamiecki | May 31, 1932 |
| 1,885,863 | Satterlee | Nov. 1, 1932 |
| 1,910,191 | Tisdale | May 23, 1933 |
| 1,977,134 | Ling et al. | Oct. 16, 1934 |
| 2,019,929 | Pupke | Nov. 5, 1935 |
| 2,068,226 | Buck | Jan. 19, 1937 |
| 2,146,005 | Bernholz et al. | Feb. 7, 1939 |
| 2,168,443 | Johnson | Aug. 8, 1939 |
| 2,217,881 | Allen | Oct. 15, 1940 |
| 2,322,602 | Terry | June 22, 1943 |
| 2,348,051 | Blakely | May 2, 1944 |
| 2,385,347 | Chadwell | Sept. 25, 1945 |
| 2,398,988 | Ziebolz | Apr. 23, 1946 |
| 2,435,260 | Wise et al. | Feb. 3, 1948 |
| 2,486,406 | Higonnet | Mar. 1, 1949 |